US012716749B2

(12) United States Patent
Zhang

(10) Patent No.: US 12,716,749 B2
(45) Date of Patent: Aug. 25, 2026

(54) SYSTEM AND METHOD FOR ESTIMATING AN INTERSECTION CONNECTION POINT

(71) Applicant: HERE Global B.V., Eindhoven (NL)

(72) Inventor: Zhenhua Zhang, Pocatello, ID (US)

(73) Assignee: HERE Global B.V., Eindhoven (NL)

( * ) Notice: Subject to any disclaimer, the term of this patent is extended or adjusted under 35 U.S.C. 154(b) by 273 days.

(21) Appl. No.: 18/082,321

(22) Filed: Dec. 15, 2022

(65) Prior Publication Data

US 2024/0200978 A1 Jun. 20, 2024

(51) Int. Cl.
*G01C 21/00* (2006.01)

(52) U.S. Cl.
CPC ..... *G01C 21/3867* (2020.08); *G01C 21/3819* (2020.08)

(58) Field of Classification Search
CPC . G01C 21/3867; G01C 21/3819; G01C 21/30
See application file for complete search history.

(56) References Cited

U.S. PATENT DOCUMENTS 11,156,466 B2 10/2021 Morimoto
2010/0312527 A1 12/2010 Weiland et al.
2019/0329783 A1 10/2019 Shalev-Shwartz et al.
2020/0049516 A1* 2/2020 Morimoto ............ G05D 1/0278
2022/0306116 A1* 9/2022 Hashimoto ..... B60W 30/18163
2022/0309806 A1* 9/2022 Zhou .................... G06V 20/588

FOREIGN PATENT DOCUMENTS

CN 113053054 A 6/2021

OTHER PUBLICATIONS

Duchow et al., "Aggregating lane markings into lanes for intersection assistance," 2007 IEEE Intelligent Vehicles Symposium, 2007, pp. 722-727.
Kouthon "Achieving vehicle spatial awareness through sensor fusion", Feb. 16, 2022, retrieved from https://www.electronicdesign.com/technologies/test-measurement/article/21215035/rambus-achieving-vehicle-spatial-awareness-through-sensor-fusion, 9 pages.
Lytrivis et al., "Sensor data fusion in automotive applications", Sensor and Data Fusion, Feb. 2009, pp. 123-140.

* cited by examiner

*Primary Examiner* — Anne Marie Antonucci
*Assistant Examiner* — Jingli Wang
(74) *Attorney, Agent, or Firm* — DITTHAVONG, STEINER & MLOTKOWSKI

(57) ABSTRACT

A system is disclosed for estimating intersection connection point. The system, for example, obtains first feature data for a first feature line, obtains second feature data for a second feature line. The second feature line is within a first predefined threshold from the first feature line. The system identifies an intersection area based on the first feature data and the second feature data, the intersection area comprising a candidate intersection point; estimates an offset value for the first feature line and the second feature line within the intersection area; estimates heading information for the candidate intersection point based on the first feature data, the second feature data and the intersection area; and estimates the intersection connection point for the first feature line and the second feature line based on the candidate intersection point, the offset value and the heading information.

20 Claims, 8 Drawing Sheets

700

OBTAIN FIRST FEATURE DATA FOR A FIRST FEATURE LINE — 702

OBTAIN SECOND FEATURE DATA FOR A SECOND FEATURE LINE — 704

IDENTIFY AN INTERSECTION AREA — 706

DETERMINE A MEDIAN OFFSET VALUE FOR A FIRST AREA — 708

ESTIMATE AN OFFSET VALUE FOR THE INTERSECTION AREA — 710

ESTIMATE HEADING INFORMATION — 712

ESTIMATE AN INTERSECTION CONNECTION POINT FOR AN INTERSECTION LOCATION — 714

SYSTEM AND METHOD FOR ESTIMATING AN INTERSECTION CONNECTION POINT

TECHNOLOGICAL FIELD

The present disclosure generally relates to generating linear features in map databases, and more particularly relates to generating accurate linear features of intersection connection point in map databases.

BACKGROUND

Navigation applications for a vehicle generally rely on data stored in a map database for identifying various navigation related entities such as road objects, curbs, barriers, links, lane markings, road segments, road geometries and the like. In case the vehicle is an autonomous vehicle, accurate detection of navigation related entities becomes more important to provide a safe and reliable navigation service. However, sometimes the data stored in the map database may be incomplete or inaccurate due to many reasons. These may include, for example, errors in data collection, less frequent data updating in the map database, and presence of obstructions during data collection.

In particular, due to hardware wear off, different driving patterns, or partial occlusion detection from one source may be inaccurate and have gaps. Data collections from different sources may have location and orientation difference. Therefore, merging detections from different sources and unifying the differences in location and orientation for generating accurate navigation related entities, such as lane markings is difficult. Owing to errors in lane markings, estimating accurate intersection connection point between feature lines is also difficult. In such cases, it is imperative to supplement the conventional methods of data processing for generating the navigation related entities with additional methods and systems.

Therefore, there is a need to have updated and accurate map data related to navigation entities, specifically, for feature lines on roads and intersection locations, for provision of accurate navigation services.

BRIEF SUMMARY OF SOME EXAMPLE EMBODIMENTS

The modern day navigation services are based on high definition (HD) maps and real-time data for depicting map data with greater clarity and accuracy on superior in-vehicle user interfaces. In such cases, it becomes critical to depict information of navigation related entities and their attributes with accuracy, clarity and precision. The navigation related entities may include, but are not limited to, road objects, curbs, barriers, links, lane markings, road segments, road geometries, water bodies, railway markings on roads, and the like.

However, due to reliance of data collection technologies on a plurality of data sources for collecting map data (like for high definition maps), likelihood of errors in the collected data due to different types of data sources may increase. Examples of the plurality of data sources may include, but are not limited to, sensors, satellite imagery, ground truth vehicles, and the like. In some cases, the collected data may be optimized to fill gaps and enhance accuracy of navigation related entities.

For example, in the case of map data related to feature lines, there may be reliance on data sources with image recognition capabilities for detecting linear features (referred to as detection data) of the feature lines. These data sources may include vehicle sensors or cameras. For a given feature line, detection data detected by a first vehicle may be different from detection data detected by a second vehicle. This difference may arise due to a number of reasons, including but not limited to, different hardware, hardware wear off, malfunctioning in a detection component, partial occlusion of the feature lines by nearby trees or nearby vehicles, faded feature lines, and the like. Such difference may then lead to incomplete and discontinuous detection data or linear features related to the feature lines.

In some cases, detection data from different data sources may have different number of sample collection points or collection locations. In an example, detection data collected by one vehicle may collect linear features for 'n' number of location points associated with a feature line, while another vehicle may collect linear features for 'm' number of location points associated with the feature line. As a result, merging of 'n' linear features for the feature line with 'm' linear features of the feature line may result in a skewed resultant feature line. Such resultant feature line may also not be accurate. In certain cases, certain location points from 'n' may correspond to location points from 'm'. However, the collected linear features from the different data sources may also have location and orientation difference. Therefore, due to difference in number of sample collection points, and differences in orientation and location in linear features, the resultant feature line generated using the linear features from different data sources may be inaccurate and hamper driver safety.

The errors in linear features are more prominent near intersection locations, such as intersection between two lane markings, intersection of a road curb with a lane marking, intersection of barrier with lane markings, intersection between a lane marking and a railway crossing, and so forth. Therefore, errors in estimating a marking for an intersection location are significant. The errors in linear features corresponding to intersection locations may be caused due to, incomplete, incorrect and/or duplicate data related to linear features of feature lines, especially for the intersection location, and inaccurate merging of detection data of feature lines. Due to the errors in estimated linear features for the intersection locations, correct marking or connection point for the intersection location is not identified.

The feature lines may be depicted on a mapping interface, such as on the high definition (HD) map, which may show an incorrect intersection location due to errors. This may pose serious problems in navigation of vehicles. Specifically, in case of autonomous vehicles, the problem may become graver if accurate feature line, intersection marking and corresponding information is not provided in real-time, leading to delayed navigation decision and accidents.

In order to solve the foregoing problem, the present disclosure may provide systems and methods that estimate an intersection connection point. The methods and systems provide techniques for complementing the sensor data (or detection data) and map data with advanced algorithms so that linear features or detection data from different data sources may be optimized to generate feature lines, missing parts in the feature lines may be completed, and the feature lines are close or accurate with regard to real roads. Further, an intersection connection point between feature lines is accurately estimated based on improved feature lines and optimization process. The accurate feature lines and/or intersection connection point may be used to update map data. The updated map data may then be used in various navigation applications to provide reliable, safe, and accurate navigation. Further, the updated map data may aid in avoiding unwanted conditions such as road accidents, head-on collisions of vehicles, fatalities, and the like.

Various embodiments are provided herein for estimating an intersection connection point for feature lines, which may have accurate markings corresponding to an intersection location. The estimating of the intersection connection point may include merging different detection data from different sources in an improved manner to generate feature data for feature line. Further, the intersection connection point is estimated for at least two feature lines, namely a first feature line and a second feature line. In this regard, first feature data for the first feature line and second feature data for the second feature line are obtained. The second feature line is within a first predefined threshold from the first feature line, such that certain features of the second feature line may overlap or be in close proximity to certain features of the first feature line. Thereafter, an intersection area is estimated based on the first feature data and the second feature data. The intersection area comprises at least one candidate intersection point between the first feature line and the second feature line. First, an offset value for the first feature line and the second feature line within the intersection area is estimated. Second, heading information for the candidate intersection point based on the first feature data, the second feature data and the intersection area is estimated. Based on the candidate intersection point, the offset value and the heading information, an intersection connection point for the first feature line and the second feature line is estimated. For example, the candidate intersection point may be estimated as the intersection connection point when the offset value and the heading information for the candidate intersection point satisfy an optimization function threshold.

Thus, as disclosed herein, the methods and systems describing the process disclosed in various embodiments, does not need to rely on map data and sensor data solely to improve the feature lines and the intersection connection points. Therefore, the methods and systems provide efficient mechanisms to improve linear features of feature lines, and subsequently use the improved feature lines to improve linear features of intersection connection points. The improved linear features of the feature lines and the intersection connection points may be used in navigation applications. This is highly advantageous especially in the case of autonomous vehicles, which benefit from getting accurate, complete, and up-to-data feature data in real-time. This further ensures faster decision making while driving and thus, safer, and reliable navigation. Even in the case of semi-autonomous or manually driven vehicles, the correct, up-to-date, and complete data ensures better and reliable navigation. Further, the improved linear features may be used to update the map database and thus improve the quality of the map data, by removing inaccurate feature lines and intersection connection points for feature lines, which is helpful for all navigation services provided by using the map database.

A system, a method and a computer programmable product are provided for implementing the process for estimating intersection connection point by improving linear features of feature lines and estimating improved linear features associated with an intersection connection point between feature lines.

In one aspect, a system for estimating an intersection connection point is disclosed. The system comprises a memory configured to store computer-executable instructions; and at least one processor configured to execute the computer-executable instructions to obtain first feature data for a first feature line. The at least one processor is further configured to obtain second feature data for a second feature line. The second feature line is within a first predefined threshold from the first feature line. The at least one processor is further configured to identify an intersection area based on the first feature data and the second feature data. The intersection area comprises a candidate intersection point. The at least one processor is further configured to estimate an offset value for the first feature line and the second feature line within the intersection area. The at least one processor is further configured to estimate heading information for the candidate intersection point based on the first feature data, the second feature data and the intersection area. The at least one processor is further configured to estimate an intersection connection point for the first feature line and the second feature line based on the candidate intersection point, the offset value and the heading information.

In additional system embodiments, the at least one processor is further configured to determine a median offset value for a first area based on the first feature data and the second feature data. The first area is within a second predefined threshold from the intersection area. The at least one processor is further configured to estimate the intersection connection point based on the median offset value for the first area.

In additional system embodiments, the at least one processor is further configured to estimate a median line segment within the intersection area, such that the median line segment is equally distanced from the first feature line and the second feature line, and the candidate intersection point lies on the median line segment.

In additional system embodiments, the at least one processor is further configured to estimate the intersection connection point based on an optimization function. The optimization function is associated with the offset value, the heading information, and a median offset value.

In additional system embodiments, the at least one processor is further configured to estimate a heading line for the first feature line and the second feature line and estimate the heading information for the candidate intersection point based on the heading line. The heading line extends from the candidate intersection point to a first end location point of one of the first feature line or the second feature line.

In additional system embodiments, the first feature line and the second feature line comprises an intersection location therebetween, and wherein the intersection connection point corresponds to the intersection location.

In additional system embodiments, the at least one processor is further configured to obtain first detection data of a first detection line associated with the first feature line, the first detection data comprising a first number of detection points. The at least one processor is further configured to obtain second detection data of a second detection line associated with the first feature line. The second detection data comprises a second number of detection points, wherein the first number of detection points is greater than the second number of detection points. The at least one processor is further configured to generate third detection data for the second detection line based on the first number of detection points and the second detection data. The third detection data comprises a third number of detection points corresponding to the first number of detection points.

In additional system embodiments, the at least one processor is further configured to identify an overlapping area for the first detection line and the third detection line. The overlapping area comprises a first set of detection points from the first detection data and a second set of detection points from the third detection data. The at least one processor is further configured to generate matched location data for the overlapping area. The matched location data is generated by dropping a perpendicular from each of the second set of detection points to a corresponding matched location point on the first detection line. The at least one processor is further configured to generate merging data for the overlapping area based on the matched location data, the merging data comprising a median location point for each of the perpendicular.

In additional system embodiments, the at least one processor is further configured to identify a non-overlapping area for the first detection line and the third detection line. The non-overlapping area comprises one or more disconnected points relating to one of: the first detection data, or the third detection data. The at least one processor is further configured to generate a merging line segment based on the merging data. The at least one processor is further configured to generate one or more connection points for the non-overlapping area. The one or more connection points are within a distance threshold from the one or more disconnected points, wherein the one or more connection points has a gradual offset from the merging line segment towards an end point from the one or more disconnected points.

In additional system embodiments, the at least one processor is further configured to generate the first feature data for the first feature line based on at least one of: the merging data, or the one or more connection points.

In another aspect, a method for estimating intersection connection point for feature lines is provided. The method comprises obtaining first feature data for a first feature line. The method further comprises obtaining second feature data for a second feature line. The second feature line is within a first predefined threshold from the first feature line. The method further comprises identifying an intersection area based on the first feature data and the second feature data, wherein the intersection area comprises a candidate intersection point. The method further comprises estimating an offset value for the first feature line and the second feature line within the intersection area. The method further comprises estimating heading information for the candidate intersection point based on the first feature data, the second feature data and the intersection area. The method further comprises estimating an intersection connection point for the first feature line and the second feature line based on the candidate intersection point, the offset value and the heading information.

In additional method embodiments, the method further comprises determining a median offset value for a first area based on the first feature data and the second feature data. The first area is within a second predefined threshold from the intersection area. The method further comprises estimating the intersection connection point based on the median offset value for the first area.

In additional method embodiments, the method further comprises estimating the intersection connection point based on an optimization function, wherein the optimization function is associated with the offset value, the heading information, and the median offset value.

In additional method embodiments, the method further comprises estimating a median line segment within the intersection area, such that the median line segment is equally distanced from the first feature line and the second feature line, and the candidate intersection point lies on the median line segment.

In additional method embodiments, the method further comprises obtaining first detection data of a first detection line associated with the first feature line, the first detection data comprising a first number of detection points. The method further comprises obtaining second detection data of a second detection line associated with the first feature line. The second detection data comprises a second number of detection points, wherein the first number of detection points is greater than the second number of detection points. The method further comprises generating third detection data for the second detection line based on the first number of detection points and the second detection data. The third detection data comprises a third number of detection points corresponding to the first number of detection points.

In additional method embodiments, the method further comprises identifying an overlapping area for the first detection line and the third detection line. The overlapping area comprises a first set of detection points from the first detection data and a second set of detection points from the third detection data. The method further comprises generating matched location data for the overlapping area. The matched location data is generated by dropping a perpendicular from each of the second set of detection points to a corresponding matched location point on the first detection line. The method further comprises generating merging data for the overlapping area based on the matched location data, the merging data comprising a median location point for each of the perpendicular.

In additional method embodiments, the method further comprises identifying a non-overlapping area for the first detection line and the third detection line. The non-overlapping area comprises one or more disconnected points relating to one of: the first detection data, or the third detection data. The method further comprises generating a merging line segment based on the merging data. The method further comprises generating one or more connection points for the non-overlapping area. The one or more connection points are within a distance threshold from the one or more disconnected points, wherein the one or more connection points has a gradual offset from the merging line segment towards an end point from the one or more disconnected points. The method further comprises generating the first feature data for the first feature line based on at least one of: the merging data, or the one or more connection points.

In yet another aspect, a computer program product comprising a non-transitory computer readable medium having stored thereon computer executable instructions which when executed by at least one processor, cause the processor to carry out operations for estimating intersection connection point for an intersection location is provided. The operations comprise obtaining first feature data for a first feature line and obtaining second feature data for a second feature line. The second feature line is within a first predefined threshold from the first feature line. The operations further comprise identifying an intersection area based on the first feature data and the second feature data, wherein the intersection area comprises a candidate intersection point. The operations further comprise estimating an offset value for the first feature line and the second feature line within the intersection area. The operations further comprise estimating heading information for the candidate intersection point based on the first feature data, the second feature data and the intersection area. The operations further comprise estimating an intersection connection point for the first feature line and the second feature line based on the candidate intersection point, the offset value and the heading information.

In additional computer program product embodiments, the operations further comprise determining a median offset value for a first area based on the first feature data and the second feature data, wherein the first area is within a second predefined threshold from the intersection area; and estimating the intersection connection point based on the median offset value for the first area.

In additional computer program product embodiments, the operations further comprise obtaining first detection data of a first detection line associated with the first feature line; obtaining second detection data of a second detection line associated with the first feature line; and identifying an overlapping area and a non-overlapping area for the first detection line and the second detection line. The overlapping area comprises a first set of detection points from the first detection data and a second set of detection points from the second detection data. The non-overlapping area comprises one or more disconnected points relating to one of: the first detection data, or the third detection data. The operations further comprise generating merging data for the overlapping area, the merging data comprising a median location point for each of the perpendicular; and generating one or more connection points for the non-overlapping area. The one or more connection points are within a distance threshold from the one or more disconnected points, wherein the one or more connection points has a gradual offset from the merging line segment towards an end point from the one or more disconnected points. The operations further comprise generating the first feature data for the first feature line based on at least one of: the merging data, or the one or more connection points.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

Figure 1:
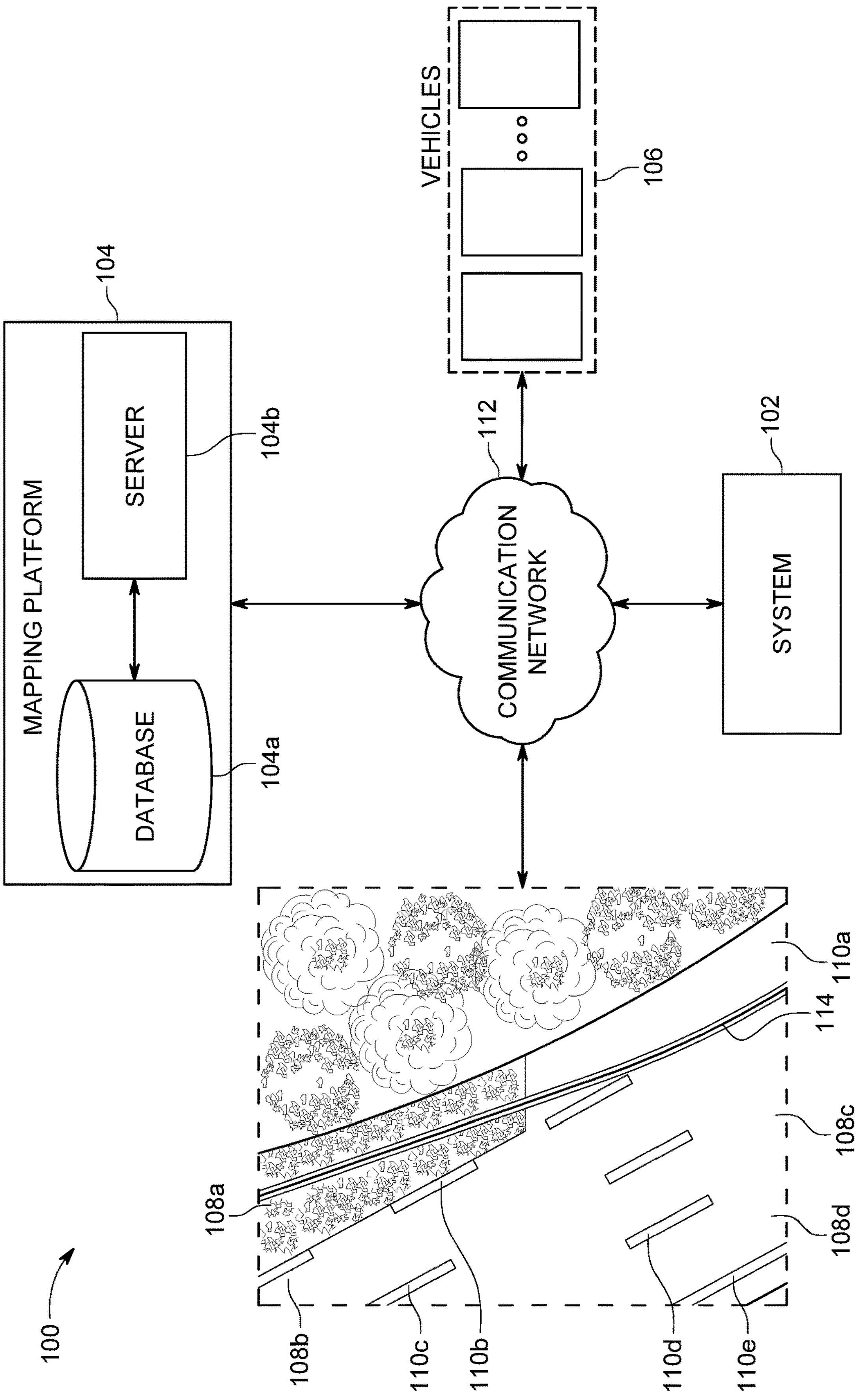
Figure 2:
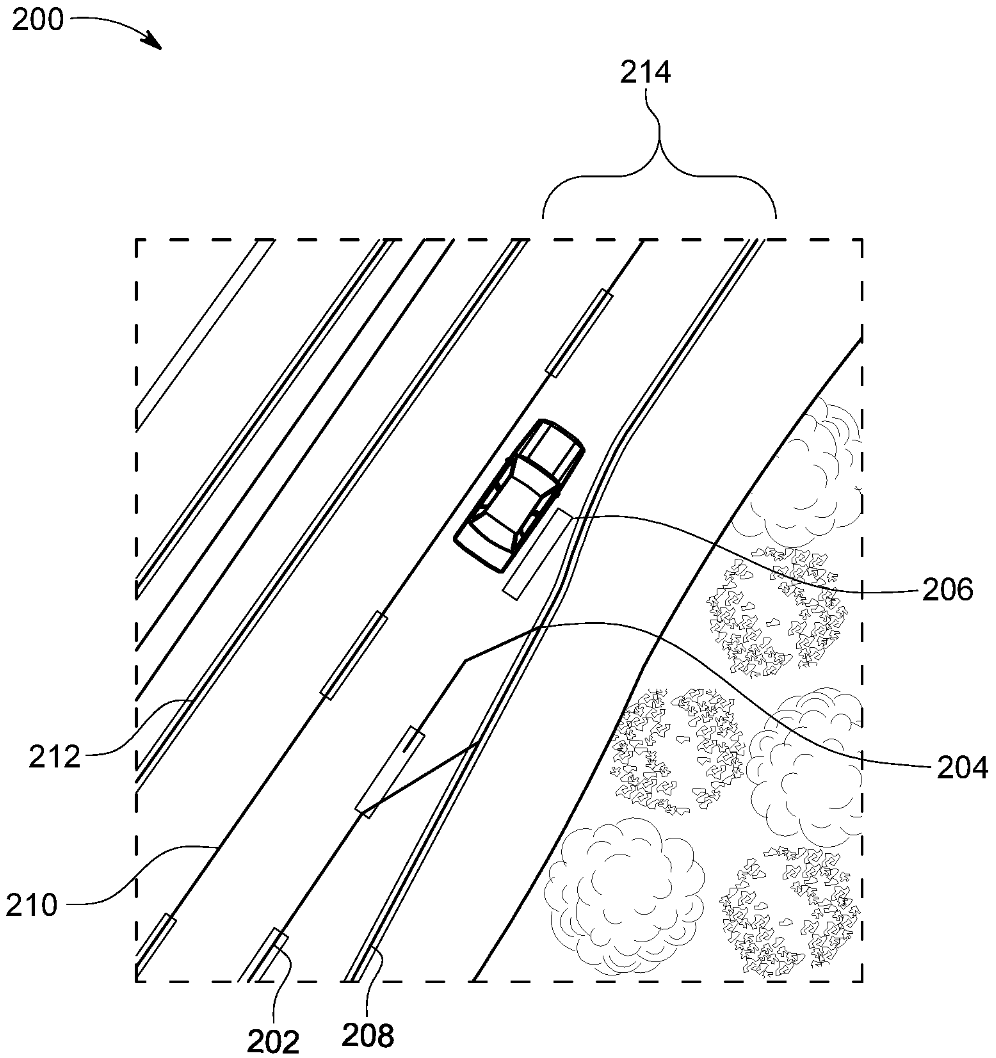
Figure 3:
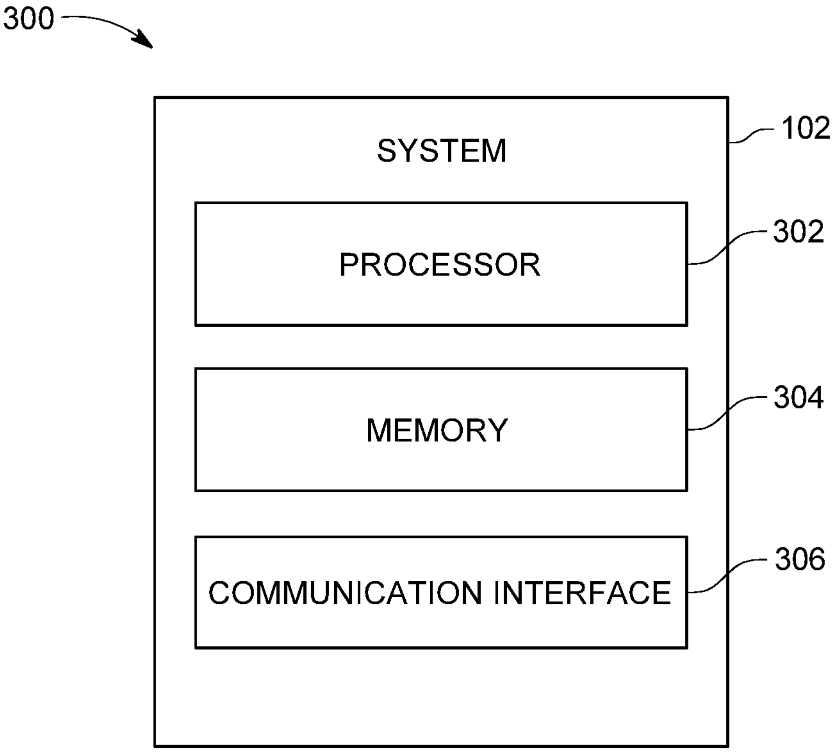
Figure 4A:
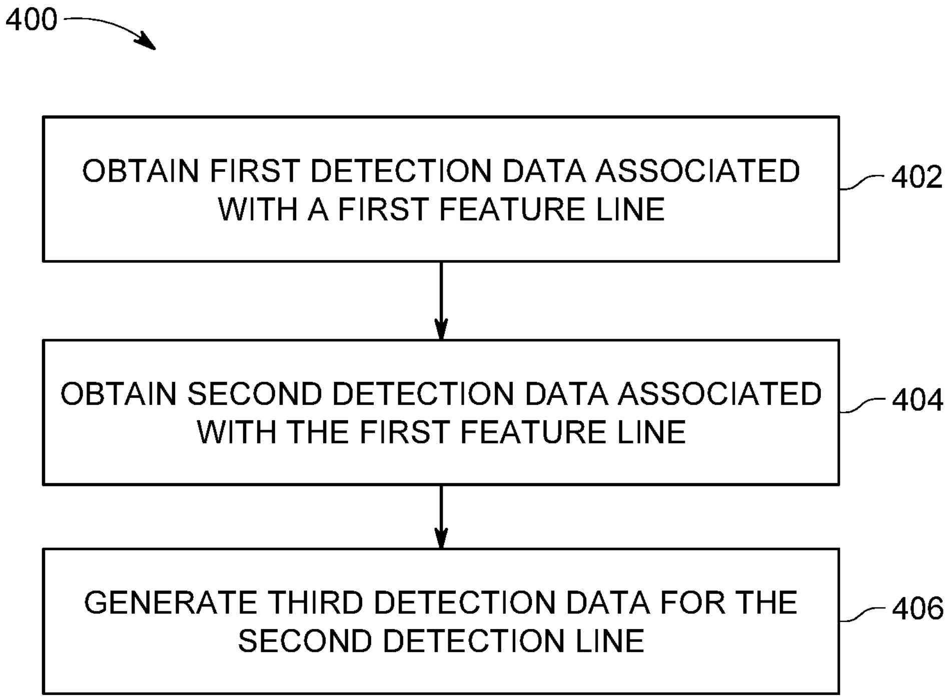
Figure 4B:
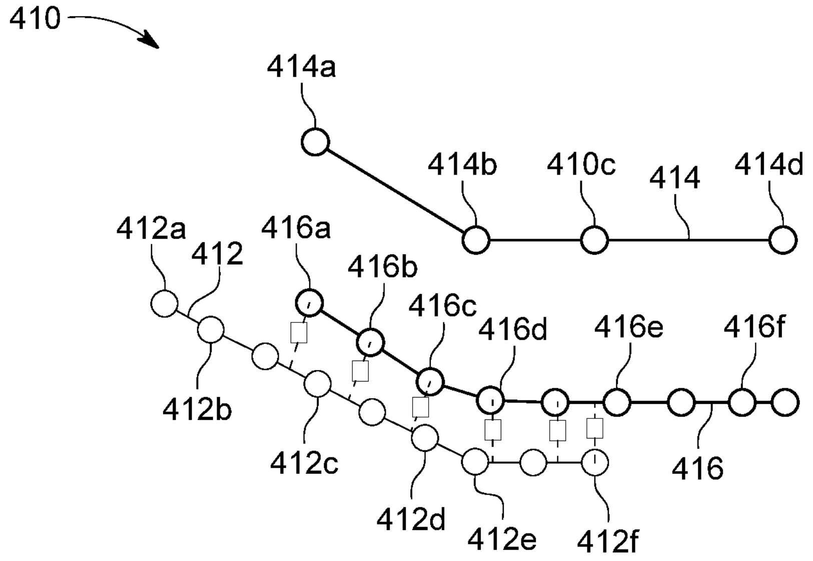
Figure 5A:
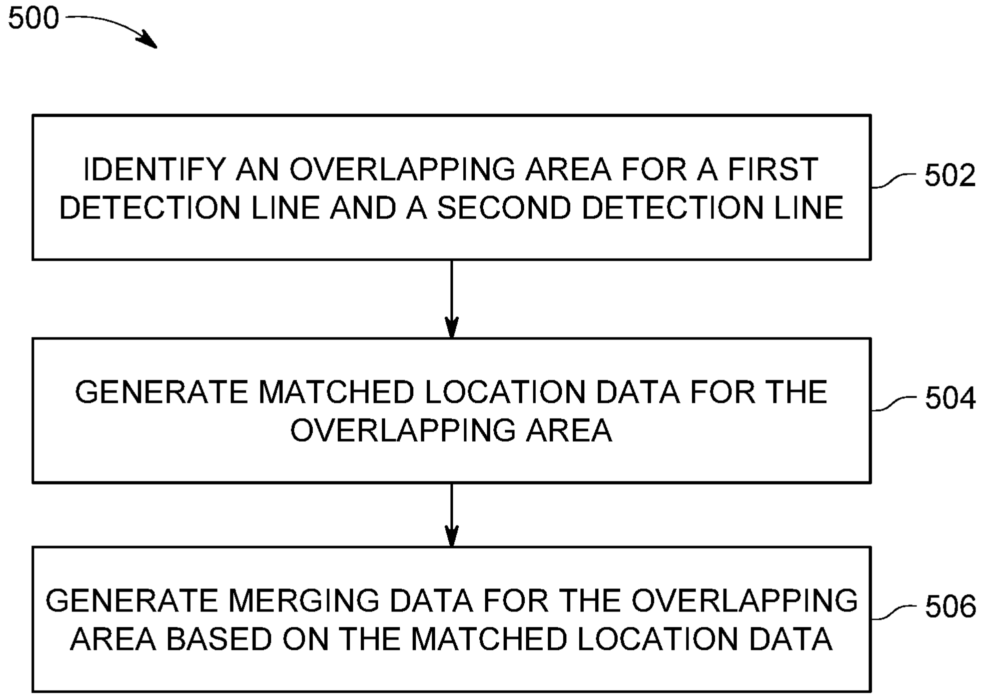
Figure 5B:
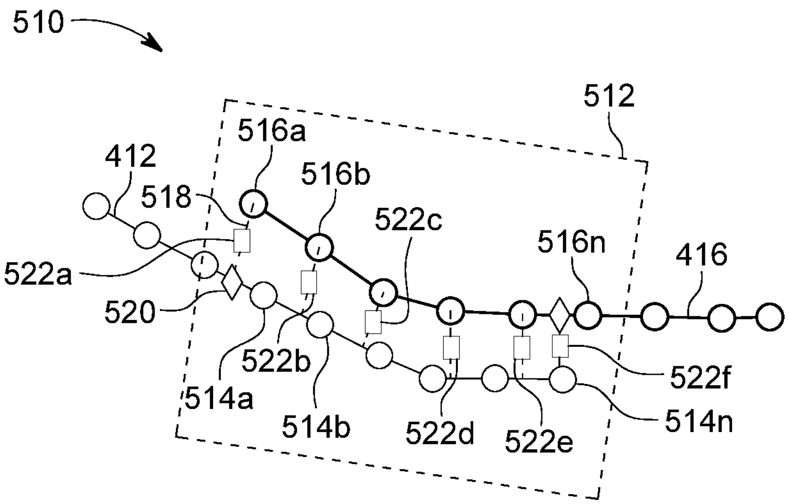
Figure 6A:
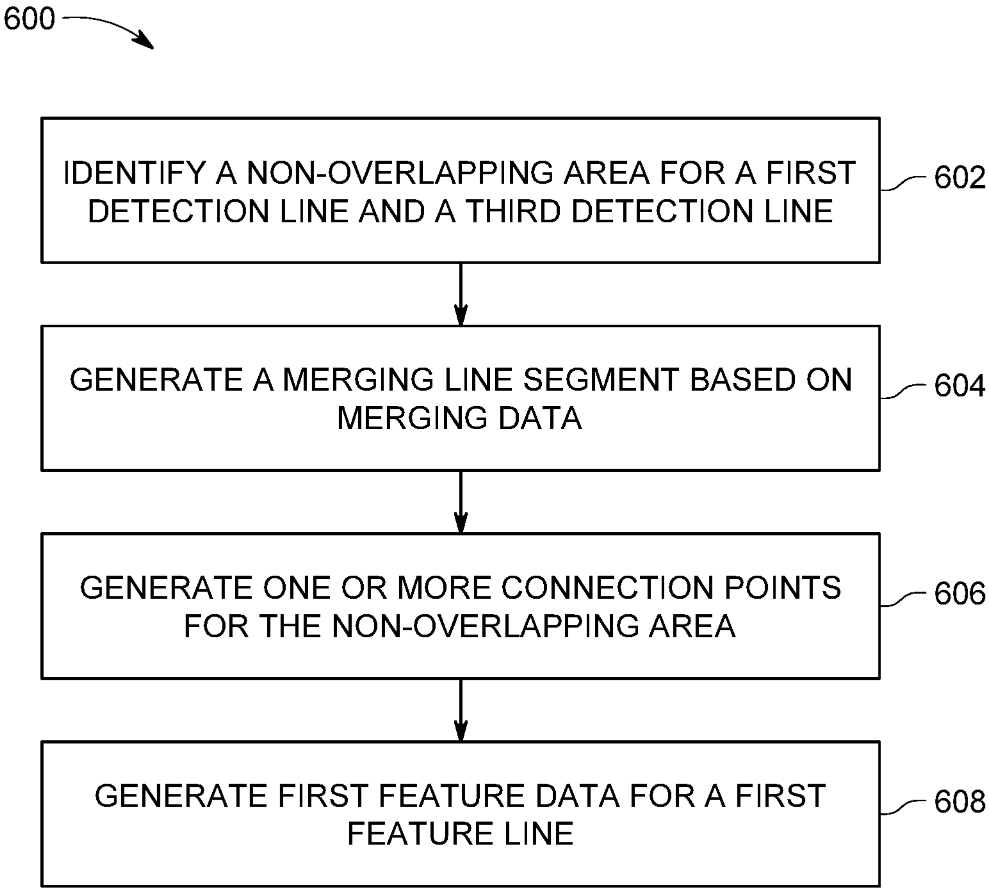
Figure 6B:
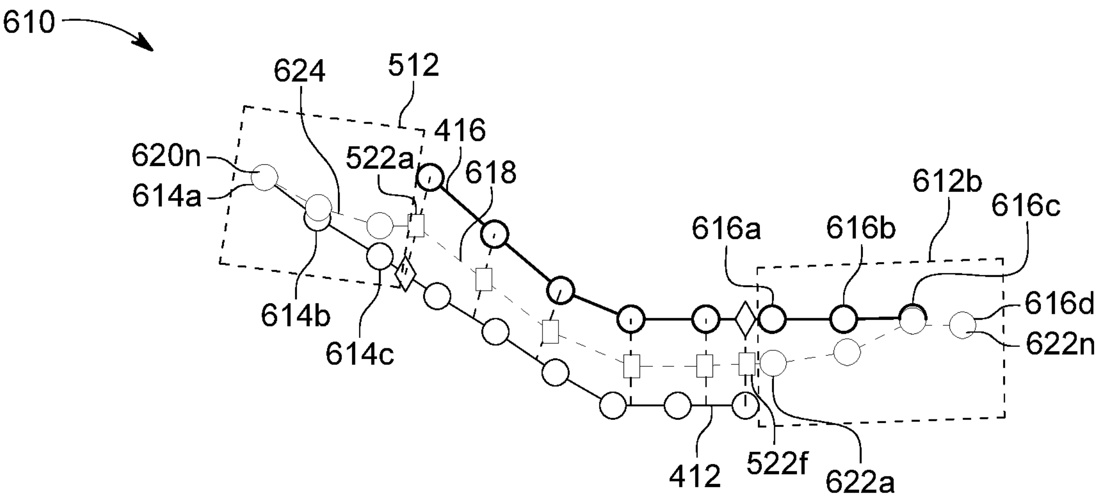
Figure 7A:
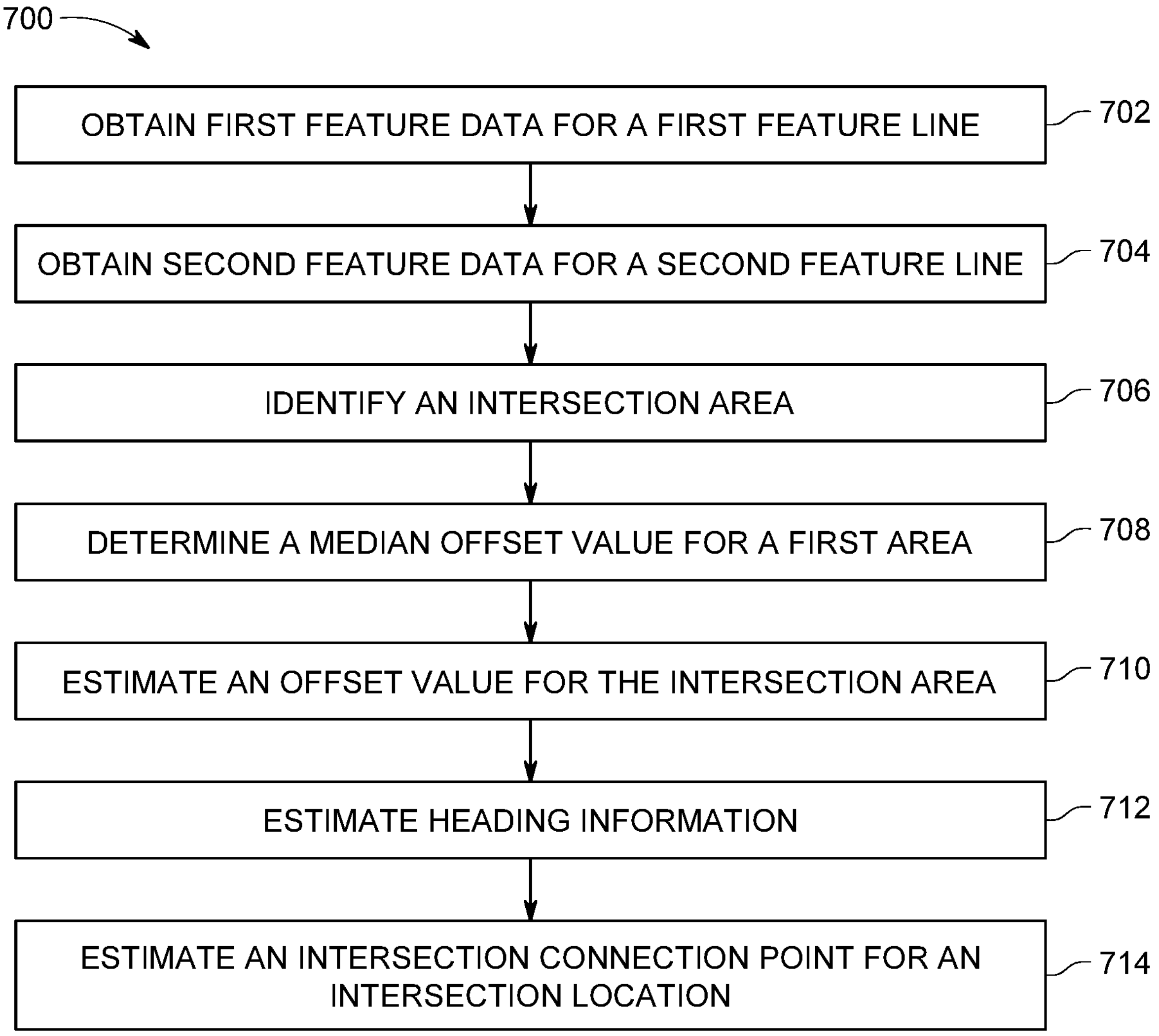
Figure 7B:
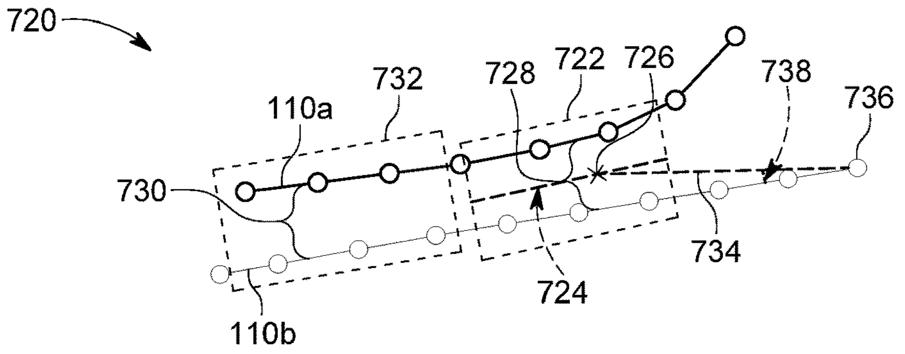
Figure 8:
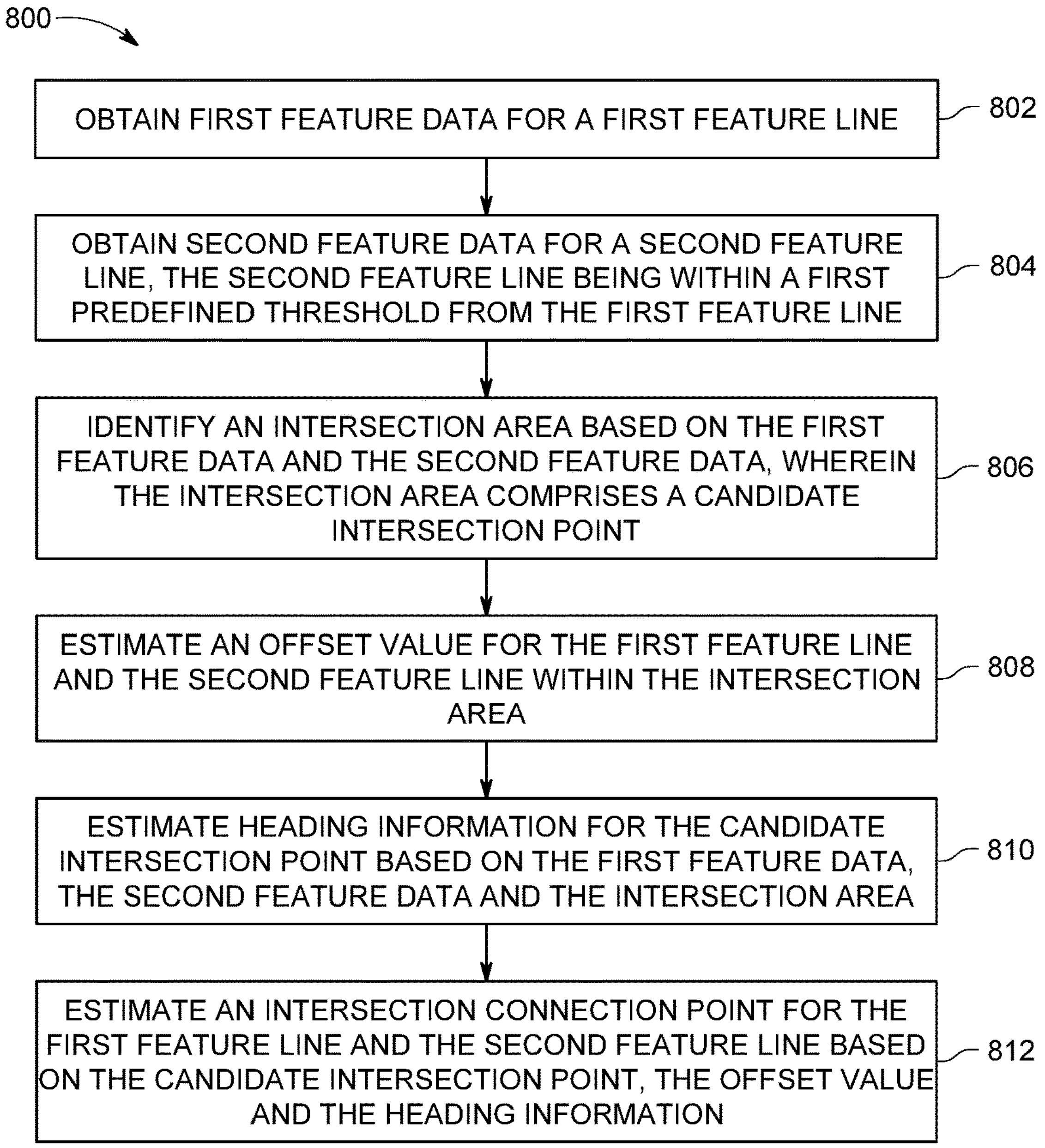
Figure 9B:
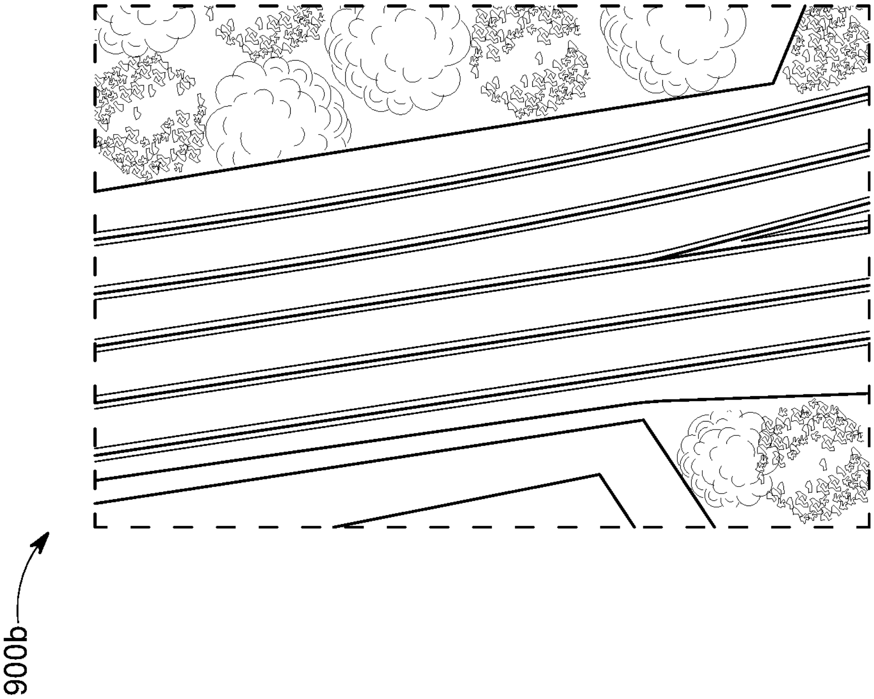
Figure 9A:
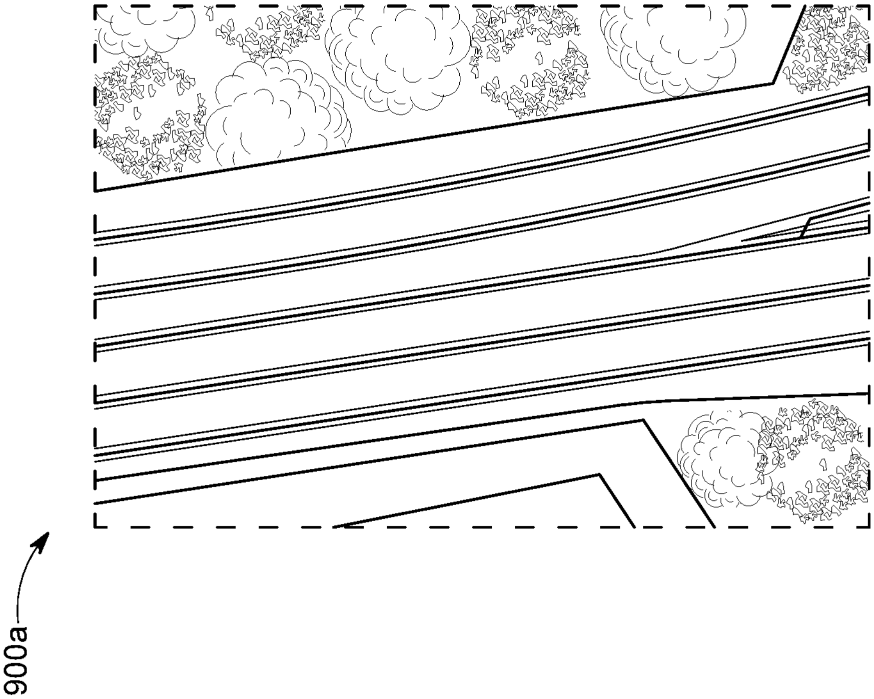

Having thus described example embodiments of the invention in general terms, reference will now be made to the accompanying drawings, which are not necessarily drawn to scale, and wherein:

FIG. 1 illustrates a block diagram of an example architecture of a system for estimating an intersection connection point, in accordance with one or more example embodiments;

FIG. 2 illustrates an exemplary user interface showing different types of feature lines on a mapping interface, in accordance with one or more example embodiments;

FIG. 3 illustrates a block diagram associated with a system for estimating an intersection connection point for an intersection location, in accordance with one or more example embodiments;

FIG. 4A illustrates a method for generating feature data for the first feature line, in accordance with one or more example embodiments;

FIG. 4B illustrates an example illustration of generation of a detection line, in accordance with one or more example embodiments;

FIG. 5A illustrates a method for generating merging data, in accordance with one or more example embodiments;

FIG. 5B illustrates an example illustration of generation of merging data, in accordance with one or more example embodiments;

FIG. 6A illustrates a method for generating first feature data for the first feature line, in accordance with one or more example embodiments;

FIG. 6B illustrates an example illustration of generation of one or more connection points, in accordance with one or more example embodiments;

FIG. 7A illustrates a method for estimating an intersection connection point, in accordance with one or more example embodiments;

FIG. 7B illustrates an example illustration of estimating an intersection connection point, in accordance with one or more example embodiments FIG. 8 illustrates a method for estimating an intersection connection point, in accordance with one or more example embodiments;

FIG. 9A illustrates an exemplar user interface showing feature lines before using the systems and methods disclosed in accordance with one or more example embodiments; and FIG. 9B illustrates an exemplar user interface showing feature lines after using the systems and methods disclosed in accordance with one or more example embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "road" may refer to a way leading a traveler from one location to another. The road may have a single lane or multiple lanes.

The term "lane" may refer to a part of a roadway that is designated to be used by a single line of vehicles to control and guide drivers and reduce traffic conflicts. Most public roads have at least two lanes, one for traffic in each direction, separated by lane markings.

The term "link" may refer to any connecting pathway including, but not limited, to a roadway, a highway, a freeway, an expressway, a lane, a street path, a road, an alley, a controlled access roadway, a free access roadway and the like.

The term "feature line" may refer to a demarcation on a road or a link identifying any line or boundary. In an example, the feature line may be associated with boundary lines of a lane on a link. The term "feature line" is also interchangeably referred to as "lane marking". The data associated with a feature line is stored in a map database. The feature line may be identified based on detection data from multiple data sources such as vehicle sensors, satellite imagery and ground truth data.

The term "feature data" may refer to data indicative of parameters or features along a feature line. The feature data of a feature line may comprise linear features relating to a plurality of location points and/or lines, that when connected, forms the feature line. The feature data for a feature line may include information, for example, latitude of an entity corresponding to the feature line, longitude of the entity, geometry of the entity, shape of the entity, size of the entity width of the entity, data record for the entity, intersection or node data record for the entity, etc. Examples of entity may include, but are not limited to, road lane, link, curb, barrier, water body, boundary of an enclosed area, railway markings, and so forth. The feature data may be stored in a map database. The various attributes associated with the entity may be included in a single data record or may be included in more than one type of records which are referenced to each other.

In an example, the feature data for a lane marking or a link may be represented by a corresponding link data record and/or lane data record. The feature data may form lane data record for identifying corresponding lane and generating the lane marking. In such case, the feature data may also be indicative of various navigation related attributes, such as speed limit, traffic sign, etc. For example, an HD lane data layer may be provided that associates lane marking of a lane or feature data of the lane with the respective link or road segments and/or other lanes or lane markings of the link. The term "feature data" is interchangeably referred to as "lane marking data" or "linear features".

The term "detection data" may refer to data corresponding to a feature line, as detected by a data source. For example, the detection data may indicate features or attributes of a feature line in raw state, as detected by a data source. For example, the detection data may be processed to generate the feature data. Examples of the data source may include, but are not limited to, vehicle sensors, road sensors, probe vehicles, probe devices, satellites, and so forth. In an example, any sensor-based device associated with a lane, such as travelling on the lane or installed on the lane may be capable of generating the detection data for the lane and/or corresponding lane marking. The sensor based devices may include a plurality of sensors, such as accelerometer, location sensor, gyroscope, air-flow sensor, speed sensor, image sensor or camera, ultrasonic sensor, speed cameras, global positioning sensor (GPS), RADAR sensor, infrared Sensor, inertial sensor, pressure sensor, and microphone. Similar to feature data, the detection data may also correspond to location points of a feature line, such as a lane marking.

The term "intersection location" refers to a location where two or more feature lines may intersect. For example, the two or more feature lines may merge at or split from form the intersection location. In an example, the two or more feature lines may correspond to lane markings, road curb marking, barrier marking, boundary of an area, railway marking, or a combination thereof.

END OF DEFINITIONS

A system, a method, and a computer program product are provided for estimating intersection connection point for an intersection location. The conventional feature lines stored in the map database may be inaccurate and have incorrect information. These incorrect feature lines need to be corrected to provide enhanced and safe navigation in autonomous, semi-autonomous and manually driven vehicles.

Various embodiments are provided herein for generating improved feature lines by correcting or improving techniques of merging of detection data, such that the improved feature lines represents lane geometry accurately and represents improved connection point of feature lines.

In various embodiments, to estimate the improved intersection connection point of feature lines, an intersection area is identified for the feature lines such that the intersection area comprises candidate intersection points. An offset value and heading information is estimated for the candidate intersection points in the intersection area. Based on the offset value and the heading information, the improved intersection connection point is estimated. The improved intersection connection point is used to generate the improved feature lines with accurate connecting point for intersection location.

FIG. 1 illustrates a block diagram 100 of an example architecture of a system 102 for estimating an intersection connection point, in accordance with one or more example embodiments. As illustrated in FIG. 1, the block diagram 100 may comprise the system 102, a mapping platform 104, vehicles 106, lanes 108*a*-108*d*, feature lines 110*a*-110*e*, and a communication network 112. The mapping platform 104 may further comprise a map database 104*a* and a server 104*b*. The components described in the block diagram 100 may be further broken down into more than one component such as one or more sensors or application in user equipment and/or combined together in any suitable arrangement. Further, it is possible that one or more components may be rearranged, changed, added, and/or removed without deviating from the scope of the present disclosure.

In various embodiments, the system 102 may be onboard a vehicle, such as the system 102 may be a navigation system installed in the vehicle for detecting feature data or detection data and using this data for performing one or more navigation functions. In various embodiments, the vehicles 106 may include, without limitation, an autonomous vehicle, a semiautonomous vehicle, or a manually operated vehicle. The vehicles 106 may be vehicles that have travelled on any of the lanes 108*a*-108*d*. The vehicles 106 may include one or more sensors, user equipment and/or a communication interface (not shown in the FIG. 1). The vehicles 106 may acquire detection data relating to the feature lines 110*a*-110*e*. The sensors of the vehicles 106 may detect the detection data for the feature lines 110*a*-110*e* of the lanes 108*a*-108*d* and transmit the detection data to the system 102. Such detection data relating to feature lines 110*a*-110*e* acquired and transmitted by the vehicles 106 may be optimized, for example, using merging techniques, to generate optimized and accurate feature data corresponding to the feature lines 110*a*-110*e*. In particular, the feature data corresponding to a feature line may include processed or any form of detection data of the feature line.

Although the present example depicts the feature lines 110*a*-110*e* as lane markings. However, this should not be construed as a limitation. In other examples of the present disclosure, feature lines may correspond to any other type of line that may be a part of a road network or map network. For example, the feature lines may correspond to, but is not limited to, road curb, foot path, barrier, boundary of a water body, railways boundary, and so forth. It may also be noted that a number of the lanes 108*a*-108*d* and geometry of the lanes 108*a*-108*d* depicted in the block diagram 100 is only exemplary and should not be construed as a limitation.

As depicted, the feature lines 110*a*-110*e* may form boundary demarcations for corresponding lanes 108*a*-108*d*. For example, boundaries of the lane 108*a* are identified by feature lines 110*a* and 110*b*, boundaries of the lane 108*b* is identified by feature lines 110*b* and 110*c*, boundaries of the lane 108*c* is identified by feature lines 110*c* and 110*d*, and boundaries of the lane 108*d* are identified by the feature lines 110*d* and 110*e*, and so forth. Some lane markings may correspond to boundaries of two adjacent lanes, such as lane marking 110*b* forms a first boundary for the lane 108*a* and a second boundary for the lane 108*b*.

Further, the system 102 may be communicatively coupled with the mapping platform 104 and the vehicles 106 over the communication network 112. The communication network 112 may be wired, wireless, or any combination of wired and wireless communication networks, such as cellular, Wi-Fi, internet, local area networks, or the like.

The mapping platform 104 may comprise the map database 104*a* for storing map data, and the processing server 104*b* for carrying out the processing functions associated with the mapping platform 104. The map database 104*a* may store node or intersection data, road segment data or link data, point of interest (POI) data, lane marking data or detection data, road obstacles related data, traffic objects related data, posted signs related data (such as road sign data), sensor data related to permissible driving directions, data about valid paths based on legally permissible road geometries or the like, and so forth. The map database 104*a* may also include cartographic data and/or routing data. The collective data stored in the map database 104*a* is referred to as map data, hereinafter.

The processing server 104*b* may comprise one or more processors configured to process requests received from the system 102. The processor may fetch map data from the map database 104*a* and transmit the same to the system 102 in a format suitable for use by the system 102. In some example embodiments, as disclosed in conjunction with the various embodiments disclosed herein, the system 102 may be used to generate improved linear features or feature data of a feature line and estimate an intersection connection point accurately.

In operation, the system 102 is configured to obtain first feature data for a first feature line, depicted for example, as the first feature line 110*a*. Further, the system 102 is configured to obtain second feature data for a second feature line, depicted for example, as the second feature line 110*b*. The second feature line 110*b* is within a first predefined threshold distance from the first feature line 110*a*. For example, the first feature line 110*a* is adjacent to the second feature line 110*b*, i.e., the first feature line 110*a* and the second feature line 110*b* are neighboring feature lines that are separated by a predefined threshold distance. In an example, an intersection location 114 is formed by merging of the first feature line 110*a* and the second feature line 110*b*.

The intersection location 114 may be defined by a corresponding intersection area which is determined based on the first feature data and the second feature data. For example, the intersection area is estimated such that the first feature line 110*a* and the second feature line 110*b* are estimated to intersect within the intersection area. To this end, the intersection area includes a candidate intersection point. In certain cases, the intersection area may include plurality of candidate intersection points, wherein one of the plurality of candidate intersection points may be estimated to be accurate. Moreover, the candidate intersection point within the intersection area may be used to estimate a marking (referred to as intersection connection point) for the intersection location 114 accurately.

In this regard, the system 102 is configured to estimate an offset value for the first feature line 110*a* and the second feature line 110*b* within the intersection area. In an example, the offset value may be a lateral distance measured between the first feature line 110*a* and the second feature line 110*b*. The lateral distance may be a length value or a distance value along a perpendicular that is drawn between the first feature line 110*a* and the second feature line 110*b* and that passes through the candidate intersection point. In an example, the offset value may indicate a deviation in a vertical axis between the first feature line 110*a* and the second feature line 110*b* with respect to each other. Moreover, the system 102 is configured to estimate heading information for the candidate intersection point based on the first feature data, the second feature data and the intersection area. In an example, the heading information may be estimated by extending a line from the candidate intersection point to one of the first feature line 110*a* or the second feature line 110*b*. For example, the heading information may indicate a difference in direction or orientation between the first feature line 110*a* and the second feature line 110*b* from the candidate intersection point. Based on the candidate intersection point, the offset value and the heading information, the system 102 is configured to estimate an intersection connection point for the first feature line 110*a* and the second feature line 110*b*.

The intersection location 114 may be represented accurately using the intersection connection point in the map database 104*a*. In an example, the intersection connection point may be a connection point of the plurality of candidate intersection points within the intersection area that may be estimated to be closest to the intersection location 114. The intersection connection point may also include estimate improved linear features associated with the intersection location 114. Based on the intersection connection point, accurate connecting point for the intersection location 114 may be identified for improving the feature lines 110*a* and 110*b*.

FIG. 2 illustrates an exemplar user interface 200 showing different types of feature lines on a mapping interface, in accordance with one or more example embodiments. The user interface 200 may be associated with one or more user equipment installed in a vehicle, such as the vehicles 106. The user interface 200 may be configured to display images about various navigation entities in the form of HD maps, where clarity and resolution of images is high (such as of the order of 320 dpi), and the information displayed about the navigation entities on the maps is collected using data sources beyond the on-board vehicle sensors only, to provide most accurate, up-to-date and real time map data. The accuracy of data is important, especially for maneuvering and control of autonomous vehicles. However, feature lines depicted on the user interface 200 may not be accurate, i.e., the depicted feature lines may not conform to real or physical road geometry.

For example, on the user interface 200, different feature lines are depicted. A feature line 202 (referred to as second feature line 202, hereinafter) is having discontinuities as some parts are missing in the second feature line 202 making it appear dashed, rather than in the form of a continuous line on the user interface 200. Moreover, the second feature line 202 is not accurate as the lines or markings of the second feature line 202 do not conform to actual road geometry. In addition, a connection point 204 for an intersection location 206 present on the second feature line 202 is depicted incorrectly. The second feature line 202 may thus fail to give accurate information about lanes and road geometry through the user interface 200. Due to inaccurate feature lines, in certain cases, reaction time for a driver may be less. This may affect navigation on the road and may cause collisions.

In an example, on the user interface 200, other feature lines are depicted, such as a feature line 208 (also referred to as, first feature line 208), a feature line 210 and a feature line 212 relating to a link 214. As shown, even though the first feature line 208 is continuous, it fails to conform to real geometry of the lane. Such error in the first feature line 208 may be skewed due to difference in location and orientation of detection data acquired by different data sources and improper merging of such detection data.

The purpose of the methods and systems (such as the system 102) disclosed herein, is to accurately merge different detection data for a particular feature line, complete missing parts of an incomplete feature line, and improve accuracy of inaccurate feature lines, such as by improving accuracy of the feature lines 208, 210 and 212 and accuracy of the connection point 204 for the intersection location 206. The system 102 may then generate new feature lines that are complete and accurate and thus can be used reliably for navigation.

As already discussed, the feature lines, such as the feature lines 202, 208, 210 and 212 may have associated detection data and/or feature data stored in the map database 104*a*. Thus, when improved feature lines for the feature lines 202, 208, 210 and 212 are generated, the system 102 is also configured to update the map database 104*a* based on the generated, improved feature lines and feature data associated with the improved feature lines. This ensures that the map data stored in the map database 104*a* is highly accurate and up to date. In some embodiments, the feature lines 202, 208, 210 and 212 are associated with the corresponding link 214, and data relating to the feature lines 202, 208, 210 and 212 is stored in form of link data record for the link 214 or lane data record referenced to the link data record of the link 214, in the map database 104*a*.

FIG. 3 illustrates a block diagram 300 associated with the system 102 for estimating an intersection connection point for an intersection location, in accordance with an embodiment disclosed herein. The embodiments of FIG. 3 are explained in conjunction with FIG. 1. However this should not be construed as a limitation. The system 102 may be configured to improve feature lines, such as feature lines 110*a*-110*e*, 202, 208, 210 and 212 and estimate intersection connection point between feature lines for corresponding intersection locations, such as the intersection locations 114 and 206.

The system 102 may include at least one processor 302, a memory 304, and at least one communication interface 306. The at least one processor 302 (referred to as processor 302, hereinafter) may be embodied in a number of different ways. The memory 304 may be non-transitory and may include, for example, one or more volatile and/or non-volatile memories.

The processor 302 of the system 102 may be configured to determine the intersection connection point for the intersection location 114, based on the feature data and the map data. Further, based on the intersection connection point for the intersection location 114, the processor 302 may generate or update the first feature line 110*a* and/or the second feature line 110*b* associated with the intersection location 114. The processor 302 may be further configured to update map database 104*a* and navigation instructions for travelling on a lane or any geographic area associated with the updated first feature line 110*a* and/or the second feature line 110*b*.

The processor 302 is configured to determine first feature data for the first feature line 110*a*. In an example, the first feature line 110*a* may relate to a first lane 108*a* on a link, such that the first feature line 110*a* forms a boundary of the first lane form one side. The first feature line 110*a* or a part of the first feature line 110*a* may be substantially parallel to its neighboring feature lines, such as the feature lines 110*b*, 110*c*, 110*d* and 110*e* on the link. Further, the processor 302 is configured to determine second feature data for the second feature line 110*b*. For example, the second feature line 110*b* may also relate to the first lane 108*a* on the link, such that the second feature line 110*b* forms a boundary of the lane form another side. The second feature line 110*b* or a part of the second feature line 110*b* may be substantially parallel to its neighboring lane markings, such as the lane markings 110*a*, 110*c*, 110*d* and 110*e* on the link.

For example, the processor 302 may be configured to determine the first feature data and the second feature data based on sensor data or detection data and map topology data relating to the first lane. Moreover, the intersection location 114 may be formed between the first feature line 110*a* and the second feature line 110*b*. In another embodiment of the present disclosure, the processor 302 may obtain the first feature data for the first feature line 110*a* from the map database 104*a*. In an example, the first feature line 110*a* is identified by checking a distance from the second feature line 110*b* to the first feature line 110*a*. For example, the first feature line 110*a* may be adjacent to the second feature line 110*b*.

To improve the first feature line 110*a* and the second feature line 110*b*, the processor 302 may start optimization process by improving the feature lines 110a-110e. For example, the processor 302 may generate improved feature lines for the feature lines 110a-110e based on detection data or sensor data and map topology data relating to the corresponding feature lines 110a-110e. In an example, the processor 302 may obtain the detection data from one or more sensors on-board vehicles, such as the vehicles 106, probe vehicles, etc. Moreover, the processor 302 may obtain the map topology data from the map database 104a and/or other images relating to the link 214. Such other images may include, for example, link data records, satellite images, bird's-eye-view images, and so forth. Further, the processor 302 may initialize a line constructor for generating the feature lines 110a-110e based on the corresponding detection data and the map topology data.

In an example, the processor 302 is configured to merge one or more detection lines from different data sources for a particular feature line. The processor 302 is configured to merge the one or more detection lines in a manner such that a resultant feature line is not skewed and is true to its geometry. The processor 302 is configured to merge the one or more detection lines by matching a number of sample points between the one or more detection lines, determining merging data for the one or more detection lines, and combining the merging data with the one of the detection lines by a gradual offset. A manner in which the improved feature lines 110a-110e are generated is described in detail in conjunction with FIG. 4A, FIG. 4B, FIG. 5A, FIG. 5B, FIG. 6A and FIG. 6B.

Once the improved feature lines for the feature lines 110a-110e are generated, the processor 302 is configured to improve feature data or linear features of the intersection location 114. In this regard, the processor 302 is configured to estimate an intersection connection point for the intersection location 114 based on an identified intersection area. Based on the estimated intersection connection point, the processor 302 is configured to accurately identify an intersection point between the first feature line 110a and the second feature line 110b.

FIG. 4A illustrates a method 400 for generating first feature data for the first feature line 110a, in accordance with an embodiment. The first feature data may include linear features associated with a plurality of location points of the first feature line 110a. The quality of the linear features or feature data of the first feature line 110a, i.e., linear features that do not correspond to the intersection location 114 are improved first.

It may be noted that although the present example describes generation of first feature data, however, this should not be construed as a limitation. In other embodiments, the techniques disclosed in the method 400 may be used to generate feature data for any other feature line, for example, second feature data for the second feature line 110b, third feature data for the third feature line 110c, and so forth.

The feature data for a location point or a detection point may include at least one of, but is not limited to, latitude information, longitude information, neighboring or connected location point information, geometry related data, shape data, link data, intersection or node data, altitude data, length data, position data, orientation data, curvature data, yaw data, pitch data, roll data, traffic related data, or a combination thereof.

At 402, first detection data associated with the first feature line 110a is obtained. The first detection data is used to generate a first detection line. The first detection data may be obtained from a first data source, such as sensors on-board a first vehicle, a sensor installed in vicinity of the first feature line 110a, a sensor associated with probes or devices travelling across the first lane 108a and/or the second lane 108b or near the first feature line 110a for gathering data, etc. The first detection data is associated with a first number of detection points. In an example, the first detection data includes linear features corresponding to the first number of detection points. It may be noted that detection points of the first number of detection points may lie on the first detection line, such that the first detection line may be generated by connecting the first number of detection points in a particular sequence.

At 404, second detection data associated with the first feature line 110a is obtained. The second detection data is used to generate a second detection line. The second detection data may be obtained from a second data source, such as sensors on-board a second vehicle, a sensor installed in vicinity of the first feature line 110a, a sensor associated with probes or devices travelling across the first lane 108a and/or the second lane 108b or near the first feature line 110a for gathering data, etc. The second detection data is associated with a second number of detection points. In an example, the second detection data includes linear features corresponding to the second number of detection points. It may be noted that detection points of the second number of detection points may lie on the second detection line, such that the second detection line may be generated by connecting the second number of detection points in a particular sequence.

To this end, the first number of detection points is greater than the second number of detection points. In other words, the first number of detection points at which data may be collected by the first data source is greater than the second number of detection points at which data may be collected by the second data source.

The first detection line and/or the second detection line may be discontinuous and inaccurate. For example, the first detection line and/or the second detection line may fail to replicate exact shape, size, location, orientation and structure of the first feature line 110a as per the corresponding road geometry. Further, owing to errors in hardware of the corresponding data source, location and orientation difference, partial occlusion, and difference in number of detection points, merging of the first detection line and/or the second detection line may result in a skewed line. To eliminate the effect of bias or errors in detection data collected by different data sources, the detection lines may be divided into smaller parts.

At 406, third detection data for the second detection line is generated. In particular, as the second number of detection points in the second detection line is less, therefore, the third detection data is generated based on the first number of detection points and the second detection data. The third detection data comprises a third number of detection points corresponding to the first number of detection points. In an example, the first number of detection points in the first detection line may be 100 and the second number of detection points in the first detection line may be 40. In such a case, the system 102 is configured to generate the third detection data for the second detection line such that a third detection line generated based on the third detection data would have detection points close to 100, for example, 85, 90, 94, etc.

For example, the third detection data includes linear features for detection points from the third number of detection points. In other words, the third detection data includes linear features of the 85, 90 or 94 detection points of the third detection line. It may be noted that one or more detection points in the third detection line may correspond to detection points from the second detection line. For example, the 85 detection points of the third detection line may include the 40 detection points of the second detection line and 45 newly identified detection points. To this end, the third number of detection points may be similar or equal to the first number of detection points.

In this manner, the second detection line may be divided into smaller segments to match a count of detection points of the second detection line with count of detection points in the first detection line. This step eliminates the effects of count difference in the number of detection points in the first detection line and the second detection line. The division of the step also reduces the effects of length difference between detection lines. It may be noted that smaller the divided part or a segment is, the more accurate the merging will be.

FIG. 4B illustrates an example illustration 410 of generation of a third detection line 416, in accordance with an embodiment. In an example, the third detection line 416 is generated using the second detection data. As described above, a first detection line 412 may be generated using first detection data from a first data source. Moreover, a second detection line 414 may be generated using second detection data from a second data source. It may be noted that the first detection line and the second detection line relates to a same feature line, such as the first feature line 110*a*. To this end, the first detection line 412 comprises detection points, depicted as detection points 412*a*, 412*b*, 412*c*, 412*d*, 412*e*, and 412*f*, and the second detection line 414 comprises detection points, depicted as detection points 414*a*, 414*b*, 414*c*, and 414*d*. As may be noted a first number of detection points of the first detection line 412 is greater than a second number of detection points of the second detection line 414.

In this regard, to eliminate inaccuracy due to difference in count of detection points in detection data from different data sources, a division method may be performed. The system 102 may be configured to generate third detection data comprising detection points, depicted as detection points 416*a*, 416*b*, 416*c*, 416*d*, 416*e*, and 416*f*. The third detection data comprises a third number of detection points. The third detection data may be used to generate a third detection line 416. It may be noted that linear features or detection data of the third detection line 416 corresponds to linear features or detection data of the second detection line 414. However, the third number of the detection points 416*a*-416*f* is similar or equal to the first number of the detection points 412*a*-412*f* of the first detection line.

In an example, the system 102 may generate the third detection data or the third detection line 416 by dividing the second detection line 414 based on a predefined division length. For example, the predefined division length may be set manually or determined dynamically based on the first number of the detection points 412*a*-412*f*. In an example, the system 102 may identify the division length to be 1 meter. In such a case, the system 102 may estimate linear features of different location points on the second detection line 414 that may be 1 meter apart from each other. Based on the estimated linear features, the system 102 may generate the third detection data or the third detection line 416.

It may be noted that depiction of only two detection lines for a feature line is only exemplary. In other examples of the present disclosure, there may be more than two detection lines. In such a case, count of detection points in each of one or more detection line may be matched with a count of detection points of a detection line having maximum number of detection points.

Once the count of the two detection points 412 and 416 are matched, the two detection points 412 and 416 may be merged smoothly with reduced inaccuracy. The method of merging the two detection points 412 and 416 is further described with the following FIG. 5A, FIG. 5B, FIG. 6A and FIG. 6B.

Referring to FIG. 5A, a method 500 is illustrated for generating merging data for the first feature line 110*a*, in accordance with an embodiment. As described above, the first feature data may include linear features associated with a plurality of location points of the first feature line 110*a*. At first, the second detection line 414 is divided to generate the third detection line 416 having the third number of detection points 416*a*-416*f*. In this manner, a count of the detection points 414*a*-414*d* of the second detection line 414 is matched with a count of the detection points 412*a*-412*f* of the first detection line 412. Once the third detection line 416 is generated, the system 102 may then be configured to merge the first detection line 412 and the third detection line 416.

Although the present example describes merging of the first detection line 412 with the third detection line 416 that is generated by dividing the second detection line 414. However, this should not be construed as a limitation. In other examples of the present disclosure, the first detection line 412 may be merged with a second detection line as obtained from a second data source, for example, when count of detection points in such second detection line is similar to the first number of detection points 412*a*-412*f* of the first detection line 412.

At 502, an overlapping area for the first detection line 412 and the third detection line 416 is identified. In an example, the overlapping area includes a part of the first detection line 412 and a part of the third detection line 416. For example, the part of the first detection line 412 and the part of the third detection line 416 in the overlapping area may conform to one or more same topology segment of the first feature line 110*a*. To this end, the overlapping area comprises a first set of detection points from the first detection data relating to the first detection line 412, and a second set of detection points from the third detection data relating to the third detection line 416.

At 504, matched location data for the overlapping area is generated. The matched location data is generated by dropping a perpendicular from each of the second set of detection points to a corresponding matched location point on the first detection line 412. For example, the matched location point on the first detection line 412 may be different from the detection points 412*a*-412*f* of the first detection line 412. As a result a point obtained, such as on the first detection line 412 as a result of dropping of the perpendicular from a corresponding point on the third detection line 416, is called the matched location of the point of the first detection line 412 on the third detection line 416.

Although the present example described dropping the perpendicular from the second set of detection points of the third detection line 416, however, this should not be construed as a limitation. In other examples of the present disclosure, the matched location data may be generated by dropping perpendicular from each of the first set of detection points of the first detection line 412 to corresponding matched location on the third detection line 416.

At 506, merging data for the overlapping area is generated. The merging data is generated based on the matched location data. In particular, the merging data comprises a median location point for each of the perpendicular between each of the second set of detection points to corresponding matched locations. In an example, a median location point for a perpendicular drawn between a detection points form the second set of detection points and corresponding matched location point may be a middle point of the perpendicular. It may be noted that such middle point for each of the perpendiculars drawn within the overlapping area may be used for merging, at least in the overlapping area, the first detection line 412 and the third detection line 416.

FIG. 5B illustrates an example illustration 510 of generation of merging data, in accordance with an embodiment. In an example, the first detection line 412 is merged with the third detection line 416 in an overlapping area 512 using merging data. As described above, the overlapping area is identified between the first detection line 412 and the third detection line 416. For example, the overlapping area 512 includes a part of the first detection line 412, such that the part comprises a first set of detection points (depicted as detection points 514*a*, 514*b* . . . 514*n*) from the detection points 412*a*-412*f*. The overlapping area 512 further includes a part of the third detection line 416, such that the part comprises a second set of detection points (depicted as detection points 516*a*, 516*b* . . . 516*n*) from the detection points 416*a*-416*f*.

Thereafter, matched location data is generated for the overlapping area 512. The matched location data is generated by dropping a perpendicular from each of the second set of detection points 516*a*, 516*b* . . . 516*n* to corresponding matched location on the first detection line 412. For example, a first perpendicular 518 may be dropped from the detection point 516*a* to the matched location 520 on the first detection line 412. In a similar manner, perpendicular may be dropped from each of the second set of detection points 516*a*, 516*b* . . . 516*n*.

Further, merging data is generated for the overlapping area 512 based on the matched location data. The merging data includes median location point, depicted as median location points 522*a*, 522*b*, 522*c*, 522*d*, 522*e* and 522*f*. In an example, the median location point 522*a* is a middle point of the perpendicular 518 between the detection point 516*a* and the matched location 520.

The first set of detection points 514*a*-514*n* and the second set of detection points 516*a*-516*n* may be merged in the overlapping area 512 based on the merging data. A manner in which the first detection line 412 and the third detection line 416 are merged is explained in detail in conjunction with FIGS. 6A and 6B.

Referring to FIG. 6A, a method 600 is illustrated for generating first feature data for the first feature line 110*a*, in accordance with an embodiment. At first, the second detection line 414 is divided to generate the third detection line 416 having the third number of detection points 416*a*-416*f*. In this manner, a count of the detection points 414*a*-414*d* of the second detection line 414 is matched with a count of the detection points 412*a*-412*f* of the first detection line 412. Once the third detection line 416 is generated, the system 102 may then be configured to generate merging data for the overlapping area 512 between the first detection line 412 and the third detection line 416. Thereafter, the system 102 is configured to identify a non-overlapping area between the first detection line 412 and the third detection line 416, and merge detection points of the overlapping area with the non-overlapping area.

At 602, a non-overlapping area for the first detection line 412 and the third detection line 416 is identified. The non-overlapping area comprises one or more disconnected points relating to one of: the first detection data, or the third detection data. As may be noted, the non-overlapping area may have a part of detection line from either the first detection line 412 or the third detection line 416. Therefore, the one or more disconnected points may be from one of the detection points 412*a*-412*f*, or detection points 416*a*-416*f*.

It may be noted that there may be more than one non-overlapping area between the first detection line 412 and the third detection line 416. In an example, there may be two non-overlapping areas between the first detection line 412 and the third detection line 416. For example, a first non-overlapping area may include disconnected points from the detection points 412*a*-412*f* of the first detection line 412. Moreover, a second non-overlapping area may include disconnected points from the detection points 416*a*-416*f* of the third detection line 416. The merging data, i.e., the median location points 522*a*-522*f*, for the overlapping area 512 may be connected with the disconnected points. For example, the present method 600 may be used to connect the merging data with the disconnected points from the detection points 416*a*-416*f*. The steps of the method 600 may be used to connect the merging data with the disconnected points from the detection points 412*a*-412*f*.

Continuing further, at 604, a merging line segment is generated based on the merging data. For example, the merging line segment may be generated by connecting the median location points of each of the perpendicular between each of the second set of detection points 516*a*, 516*b* . . . 516*n* and the first detection line 412.

Next, at 606, one or more connection points for the non-overlapping area are generated. The one or more connection points may connect the merging line segment with the non-overlapping area or the one or more disconnected points. To this end, the one or more connection points are within a distance threshold from the one or more disconnected points. In an example, the one or more connection points may extend from an end point of the merging line segment to an end point from the one or more disconnected points. For example, a first connection point from the one or more connection points may be closer to the end point of the merging line segment. Further, an $n^{th}$ connection point from the one or more connection points may be closer to or lie on the end point from the one or more disconnected points. It may be noted that the one or more connection points has a gradual offset from the merging line segment towards the one or more disconnected points. In particular, a distance between the one or more connection points and the corresponding one or more disconnected points may decrease gradually from the end point of the merging line segment to the end point from the one or more disconnected points.

Further, at 608, the first feature data is generated for the first feature line 110*a* based on at least one of: the merging data, or the one or more connection points. In an example, the merging line segment is generated based on the merging data for the overlapping area 518. Further, the one or more connection points are generated for connecting the overlapping area 518 with the non-overlapping area. For example, the first connection point of the one or more connection points may be connected with the end point of the merging line segment and further with a second connection point. Moreover, the end connection point of the one or more connection points may be connected with the end point of the one or more disconnected points and a second last connection point. In this manner, the one or more connection points may be connected by a line segment such that the line segment has a gradual offset towards the one or more disconnected points. The one or more connection points are thus used to connect the merging line segment for the overlapping area 512 with the one or more disconnected points of the non-overlapping area.

In this regard, the first feature data for the first feature line 110*a* is generated by merging the first detection line 412 from a first data source with an improved second detection line 414, i.e., the third detection line 416 that is obtained from a second data source. In particular, the overlapping area 512 is merged based on merging data comprising the median location points 522*a*-522*f* for the detection points of the first detection line 412 and the third detection line 416. Further, the non-overlapping area is merged based on the one or more connection points between the end point of the merging line segment and the end point of the one or more disconnected points, such that the one or more connection points has a gradual offset towards the one or more disconnected points.

FIG. 6B illustrates an example illustration 610 of generation of one or more connection points, in accordance with an embodiment. In an example, the first detection line 412 is merged with the third detection line 416 in the overlapping area 512 using merging data comprising the median location points 522*a*-522*f*. Thereafter, a non-overlapping area 612 between the first detection line 412 and the third detection line 416 may have to be merged, for example, with the merging data.

It may be noted that the non-overlapping area 612 may include a part of either the first detection line 412 or the third detection line 416. For example, a first non-overlapping area 612*a* may include detection points of the first detection line 412 and a second non-overlapping area 612*b* may include detection points of the third detection line 416. In an example, the first non-overlapping area 612*a* includes disconnected points 614*a*, 614*b* and 614*c* of the first detection line 412; and the second non-overlapping area 612*b* includes disconnected points 616*a*, 616*b*, 616*c* and 616*d* of the third detection line 416. To this end, the third detection line 416 ends before a start of the first non-overlapping area 612*a* and the first detection line 412 ends before a start of the second non-overlapping area 612*b*.

In an example, the system 102 may generate a merging line segment 618 for the overlapping area 512 based on the merging data. The merging line segment 618 connects the median location points 522*a*-522*f*. Further, the merging line segment 618 is to be connected with the first non-overlapping area 612*a* and the second a non-overlapping area 612*b* to accurately merge the first detection line 412 with the third detection line 416.

In this regard, the system 102 is configured to generate one or more connection points for the non-overlapping area, say the first non-overlapping area 612*a*. The one or more connection points (depicted as connection points 620*a* . . . 620*n*) of the first non-overlapping area 612*a* may extend between a first end point of the merging line segment 618 and the disconnected points 614*a*, 614*b* and 614*c*. As shown, the connection points 620*a* . . . 620*n* have a gradual offset towards the end point 614*a* of the disconnected points 614*a*-614*c*, such that the end point 620*n* of the connection points 620*a* . . . 620*n* is overlapping or close to the end point 614*a* of the first non-overlapping area 612*a*. It may be noted that the end point 614*a* of the first non-overlapping area 612*a* may correspond to a first detection point 412*a* of the first detection line 412.

In a similar manner, the system 102 may generate one or more connection points (depicted as connection points 622*a* . . . 622*n*) for the second non-overlapping area 612*b*. The connection points 622*a* . . . 622*n* may extend between a second end point of the merging line segment 618 and the disconnected points 616*a*, 616*b*, 616*c* and 616*d*. The connection points 622*a* . . . 622*n* may have a gradual offset towards the end point 616*d* of the disconnected points 616*a*-616*d*, such that the end point 620*n* of the connection points 620*a* . . . 620*n* is overlapping or close to the end point 616*d* of the second non-overlapping area 612*b*. It may be noted that the end point 616*d* of the second non-overlapping area 612*b* may correspond to a last detection point 416*f* of the third detection line 416.

Further, the merging line segment is connected with the one or more connection points, i.e., the connection points 620*a* . . . 620*n* and 622*a* . . . 622*n*. In this regard, the connection points 620*a* . . . 620*n* are connected through a line 624, for example, using a line constructor. The line 624 is further connected with the merging line segment 618. Moreover, the connection points 622*a* . . . 622*n* are connected through a line 626, for example, using a line constructor. The line 626 is also connected with the merging line segment 618. In this manner, the first detection line 412 is merged with the segment detection line 414 to generate the first feature line 110*a*. For example, a summation of the merging line segment 618, the line 624 and the line 626 may form the feature line 110*a*. Moreover, linear features or feature data corresponding to points, such as points 522*a*-522*f*, 620*a*-620*n*, and 622*a*-622*n* may form the first feature data for the first feature line 110*a*.

Although the FIGS. 4A, 4B, 5A, 5B, 6A and 6B describes process of generation of the first feature data for the first feature line 110*a*. However, in other embodiments of the present disclosure, the process of FIGS. 4A, 4B, 5A, 5B, 6A and 6B may be used to generate the second feature data for the second feature line 110*b*. Due to improved techniques of merging detection data or detection lines, an accurate feature data for a feature line may be generated. The improved feature data for the feature line may then be used to improve features corresponding to an intersection location between the first feature line 110*a* and the second feature line 110*b*. The steps for improving the features corresponding to the intersection location are described in detail in conjunction with the FIGS. 7A-7B.

FIG. 7A illustrates a method 700 for estimating an intersection connection point, in accordance with an embodiment. The intersection connection point may be formed between a first feature line 110*a* and the second feature line 110*b*. In particular, linear features of a part of the first feature line 110*a* may overlap with or may be in close proximity with linear feature of a part of the second feature line 110*b*. For example, if a length of overlapping area between the linear features of the first feature line 110*a* and linear features of the second feature line 110*b* is greater than a predefined threshold, then steps of the method 700 may be identified to estimate an intersection connection point between the first feature line 110*a* and the second feature line 110*b*.

At 702, the first feature data for the first feature line 110*a* is obtained. Further, at 704, the second feature data for the second feature line 110*b* is obtained. For example, the first feature data may include linear features corresponding to location points lying on the first feature line 110*a*. Similarly, the second feature data may include linear features corresponding to location points lying on the second feature line 110*b*. In an example, the first feature data and/or the second feature data may be generated by merging detection data from different data sources. A manner in which the detection data or two detection lines are merged is described in detail in FIGS. 4A, 4B, 5A, 5B, 6A and 6B.

At 706, an intersection area is identified based on the first feature data and the second feature data. The intersection area comprises a candidate intersection point. In an example, the intersection area may correspond to the overlapping area between the first feature data and the second feature data. In another example, the intersection area may correspond to an area where a distance between each of location points of the first feature line 110*a* and corresponding location points of the second feature line 110*b* is less than a threshold. In other words, the location points of the first feature line 110*a* may be in close proximity with the corresponding location points of the second feature line 110*b* within the intersection area.

In an example, the system 102 may also be configured to estimate a median line segment within the intersection area. For example, the median line segment is equally distanced from a part of the first feature line 110*a* and a part of the second feature line 110*b* that lies within the intersection area. Moreover, the candidate intersection point lies on the median line segment. For example, the intersection area may include a plurality of candidate intersection points lying on the median line segment within the intersection area.

At 708, a median offset value for a first area based on the first feature data and the second feature data is determined. In an example, the first area may lie outside the intersection area. The first area may be within a second predefined threshold from the intersection area. For example, the first area may be an area that is before the intersection area in a direction towards the intersection area. Further, the system 102 may be configured to determine the median offset value between the first feature line 110*a* and the second feature line 110*b* in the first area, i.e., before the start of the intersection area.

At 710, an offset value for the first feature line and the second feature line within the intersection area is estimated. For example, the offset value may indicate a mean offset between the first feature line 110*a* and the second feature line 110*b* within the intersection area.

At 712, heading information for the candidate intersection point is estimated. In an example, the heading information may be estimated by estimating a heading line for one of: the first feature line 110*a* and the second feature line 110*b*. In an example, the heading line may extend from the candidate intersection point on the median line segment to a first end location point of the first feature line 110*a* or the second feature line 110*b*. In another example, the heading line may extend from the candidate intersection point on the median line segment to an end location point of a topology segment of the first feature line 110*a* or the second feature line 110*b*.

At 714, an intersection connection point for the first feature line 110*a* and the second feature line 110*b* is estimated based on the candidate intersection point, the offset value, the median offset value and the heading information. In an example, the intersection connection point may be estimated based on an optimization function. For example, the optimization function is associated with the offset value, the heading information, and the median offset value. For example, the optimization function may be represented as:

$$\min \frac{Func(H_{Diff})}{Func(|d1 - dm|)};$$

where $H_{Diff}$ is the heading information or heading difference, d1 is the offset value within the intersection area, dm is the median offset value for the first area, and Func refers to the function transformation of the variable. The functions may include, but are not limited to, Based on the optimization function an accurate intersection point may be estimated between the first feature line 110*a* and the second feature line 110*b*. The estimated intersection connection point may be identified as intersection location marking corresponding to an intersection location. The estimated intersection connection may then be used to generate navigation-related instructions while ensuring safety of driver and others on road by providing intersection related information or accurate marking or connection point for intersection location beforehand. This may make driver aware of any change in road structures, such as lane width, road curb width, barrier width, foot path width, cycling track width, railway passing width, etc. with adequate reaction time for the drivers. This may further improve overall experience of drivers while using navigation related applications for navigating.

FIG. 7B illustrates an example illustration 720 of estimating an intersection connection point, in accordance with an embodiment. In may be noted that when two feature lines, such as lane markings or curbs, intersect with each other, the corresponding linear features and/or detections also intersect or overlap.

In an example, linear features of two feature lines may also overlap when the two feature lines have different elevations at a same location. However, in such a case an overlap area (i.e., an area where linear features of two feature lines are close to each other) is small or less than a threshold. Therefore, such overlapping linear features may not have to be processed to identify an intersection connection point therebetween as they may not belong to adjacent intersecting feature lines. However, when linear features of two feature lines intersect each other and merges into one linear feature, i.e., one feature line, an overlap where linear features of the two feature lines are close to each other may be long. In such a case, it becomes crucial to estimate an intersection location between the two feature lines accurately.

In this regard, the system 102 may be configured to estimate an intersection connection point between two feature lines, depicted as the first feature line 110*a* and the second feature line 110*b*. The system 102 may identify an intersection area 722 between the first feature line 110*a* and the second feature line 110*b*. For example, linear feature of the first and the second feature lines 110*a* and 110*b* may be within close proximity or less than a threshold away within the intersection area 722. Further, the system 102 may estimate a median line segment 724 for the intersection area 722. The median line segment 724 may extend between the first feature line 110*a* and the second feature line 110*b* within the intersection area 722, such that the median line segment 724 is equally distanced from the first feature line 110*a* and the second feature line 110*b*. The system 102 may then identify one or more candidate intersection points (depicted as a candidate intersection point 726) within the intersection area 722. For example, the one or more candidate intersection points may lie on the median line segment 724. In an example, the system 102 may determine certain parameters associated with each of the one or more candidate intersection points to determine which of the one or more candidate intersection points may correspond to the intersection location most precisely. In another example, the system 102 may identify one candidate intersection point 726 within the intersection area 722, estimate parameters associated with the candidate intersection point 726, and check if the candidate intersection point 726 is close to the intersection location based on corresponding parameters. In case where the candidate intersection point 726 is not close to the intersection location, the candidate intersection point 726 may be shifted or moved on the median line segment 726 to a new position and new parameters may be evaluated for the new location. In this manner, an intersection connection point for the intersection location may be estimated based on the candidate intersection point 726.

Continuing further, the system 102 is configured to estimate an offset value 728 between the first feature line 110*a* and the second feature line 110*b* within the intersection area 722. For example, the system 102 may estimate the offset value as a perpendicular distance between the first feature line 110*a* and the second feature line 110*b* such that the candidate intersection point 726 lies on the perpendicular. The system 102 may also be configured to estimate a median offset value 730 between the first feature line 110*a* and the second feature line 110*b* outside of the intersection area 722, such as in a first area 732 lying before the overlapping region or the intersection area 722. In addition, the system 102 is configured to estimate heading information for the candidate intersection point 726. In this regard, a heading line 734 may be extended from the candidate intersection point 726 to a first end location point 736 of the first feature line 110*a* or the second feature line 110*b*. Pursuant to present example, the heading line 732 may be extended from the candidate intersection point 726 to the second feature line 110*b*; however, this should not be construed as a limitation. The heading information may indicate a heading difference or an angle 738 between the heading line 734 and the second feature line 110*b* at the first end location point 736.

It may be noted that to avoid estimating a candidate intersection point too close to the intersection area 726 as the intersection connection point, a measure of offset 728 and 730 between the two feature lines are utilized. The smaller the median offset value 730 within the first area 732 and the offset value 728 in the intersection area 722, the closer an intersection connection point will be to the intersection area 722. Therefore, the offset values are optimized to be as big as possible to estimate the intersection connection point accurately.

Further, to avoid estimating a candidate intersection point too close to the first area 732, or the non-overlapping area, heading difference 738 between the candidate intersection point and the two feature line 110*a* and 110*b* may be utilized. The larger the value of the heading difference 738 is, the closer an intersection connection point will be to the first area 732. Therefore, the heading difference is optimized (min H_diff) to be as small as possible estimate the intersection connection point accurately. By combining the optimization of the offset values and the heading difference, the intersection connection point is estimated as neither too close to the intersection area 722 nor too close to the first area 732.

Based on the offset value, the median offset value and the heading information for one or more candidate intersection points and/or different locations of the candidate intersection point 726 and an optimization function, the system 102 may estimate an intersection connection point corresponding to the intersection location. The intersection connection point may closely map to the intersection location thereby giving accurate information relating to the intersection location.

FIG. 8 illustrates a flowchart of a method 800 for determining intersection location data, in accordance with an embodiment. The method 800 will be discussed in conjunction with above-described FIGS. 1-7, and appropriate references may be used interchangeably wherever required, without deviating from the scope of the present disclosure.

The method 800 comprises, at step 802, obtaining first feature data for the first feature line 110*a*. The first feature data may include improved linear features of the first feature line 110*a*, such that the first feature line 110*a* generated based on the first feature data conforms more closely to the map or road geometry. In one example, the processor 302 may generate the first feature data. In another example, the processor 302 may obtain the first feature data from the map database 104*a*. The steps of generating the first feature data is explained in detail in conjunction with FIGS. 4A, 4B, 5A, 5B, 6A and 6B.

The method 800 comprises, at step 804, obtaining second feature data for the second feature line 110*b*. The second feature data may also include improved linear features of the second feature line 110*b*, such that the second feature line 110*b* generated based on the second feature data conforms more closely to the map or road geometry. For example, the second feature line 110*b* may also be improved based on techniques described in conjunction with FIGS. 4A, 4B, 5A, 5B, 6A and 6B. The second feature line 110*b* is within a first predefined threshold from the first feature line 110*a*. In an example, the first feature line 110*a* and the second feature line 110*b* comprises an intersection location therebetween.

The method 800 comprises, at step 806, identifying the intersection area 722 based on the first feature data and the second feature data. The intersection area 722 comprises a candidate intersection point 726. In an example, the intersection area 722 may include linear features of the first feature line 110*a* and linear features of the second feature line 110*b* that are overlapping or in close proximity to each other.

The method 800 comprises, at step 808, estimating the offset value 728 for the first feature line 110*a* and the second feature line 110*b* within the intersection area 722. In an example, the offset value 728 may be determined as a length of a perpendicular line extending between the first feature line 110*a* and the second feature line 110*b* such that the perpendicular line crosses the candidate intersection point 726.

The method 800 comprises, at step 810, estimating heading information for the candidate intersection point 726 based on the first feature data, the second feature data and the intersection area 722. In an example, the heading information may include the heading difference 738 between the candidate intersection point 726 and one of the first feature line 110*a* or the second feature line 110*b*.

The method 800 comprises, at step 812, estimating an intersection connection point for the first feature line 110*a* and the second feature line 110*b* based on the candidate intersection point 726, the offset value 728 and the heading information. In an example, the offset value 728 and the heading information associated with the candidate intersection point 726 may be processed based on an optimization function. Further, based on the output of the optimization function, the candidate intersection point 726 may be estimated as the intersection connection point, moved to a new location for re-evaluation or a new candidate intersection point may be selected for evaluation.

It will be understood that each block of the flow diagram of the method 800 may be implemented by various means, such as hardware, firmware, processor, circuitry, and/or other communication devices associated with execution of software including one or more computer program instructions. For example, one or more of the procedures described above may be embodied by computer program instructions.

In this regard, the computer program instructions which embody the procedures described above may be stored by the memory 304 of the system 102, employing an embodiment of the present invention and executed by the processor 302. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the method 800 support combinations of means for performing the specified functions and combinations of operations for performing the specified functions. It will also be understood that one or more blocks of the method 800, and combinations of blocks in the method 800, may be implemented by special purpose hardware-based computer systems which perform the specified functions, or combinations of special purpose hardware and computer instructions.

Further using the steps described in the accompanying embodiments of the method 800 shown in FIG. 8, which implement the various functionalities of the system 102 described in FIG. 3, the accuracy of the map data may be highly improved. This is specifically advantageous in cases of map data related to feature lines, which may have discontinuities, inaccuracy and duplicates due to any of the reasons discussed previously. This is particularly useful for high definition maps which are used for autonomous driving vehicles, as the system 102 improves the quality of map data stored in map database 104*a*, thereby leading to more accurate, safe and reliable decision making for autonomous driving scenarios.

FIG. 9A illustrates an exemplary user interface showing lane marking data displayed on the mapping display 900*a* of a high-definition map (associated with map database 104*a*) installed in a vehicle before using the systems and methods disclosed in accordance with one or more example embodiments. As can be observed from the mapping display 900*a*, there are discontinuities and inaccuracy in the feature line data.

Further, FIG. 9B illustrates the exemplary user interface showing lane marking data on a mapping display 900*b* of the high-definition map (associated with map database 104*a*) after using the systems and methods disclosed in accordance with one or more example embodiments. As can be clearly observed, there are no discontinuities in the lane marking data on the mapping display 900*b* thereby showing efficacy, accuracy and usefulness of the methods and system disclosed in the various embodiments described herein. Further, when the vehicle associated with the mapping display 900*b* is an autonomous vehicle (that is capable of sensing its environment and operating without human involvement), the safety and reliability of navigation of the autonomous vehicle is highly improved and better maneuvering and control of the autonomous vehicle may be possible.

Additionally, the vehicle may include a motor vehicle, a non-motor vehicle, an automobile, a car, a scooter, a truck, a van, a bus, a motorcycle, a bicycle, a Segway, and/or the like. The vehicle may be a semiautonomous vehicle, or even a manual vehicle.

In some embodiments, the system 102 may comprise one or more user equipment for example as a part of an in-vehicle navigation system, a navigation app in a mobile device and the like. In each of such embodiments, the system 102 may be communicatively coupled to the components shown in FIG. 1 to carry out the desired operations and wherever required modifications may be possible within the scope of the present disclosure.

In some example embodiments, the user equipment may be any user accessible device such as a mobile phone, a smartphone, a portable computer, and the like that are portable in themselves or as a part of another portable/mobile object such as the vehicle. The user equipment may comprise a processor, a memory, and a communication interface. The processor, the memory, and the communication interface may be communicatively coupled to each other. In some example embodiments, the user equipment is associated, coupled, or otherwise integrated with the vehicle, such as an advanced driver assistance system (ADAS), a personal navigation device (PND), a portable navigation device, an infotainment system and/or other device that may be configured to provide route guidance and navigation related functions to the user. In such example embodiments, the user equipment comprises processing means such as a central processing unit (CPU), storage means such as on-board read only memory (ROM) and random access memory (RAM). In various embodiments, the vehicle may be equipped with various sensors for generating or collecting sensor data. For instance, the sensors of the vehicle may include a microphone array; position sensors such as a GPS sensor, gyroscope, a LIDAR sensor; a proximity sensor; motion sensors such as accelerometer; temporal information sensors; orientation sensors augmented with height sensors; tilt sensors; image sensors; and the like. In some example embodiments, the sensor data may be generated and reported to the system 102, at a predefined frequency. For instance, the predefined frequency may be as high as one hertz, based on the capabilities of the sensors. In any which way, the vehicle may be able to gain advantage of the system 102 and method 700, irrespective of the type of the vehicle.

In one embodiment, the user equipment may be directly coupled to the system 102 via the communication network 112. In another embodiment, the user equipment may be coupled to the system 102 via an OEM cloud and the communication network 112. For example, the user equipment may be a consumer vehicle (or a part thereof) and may be a beneficiary of the services provided by the system 102. In some example embodiments, the user equipment may serve the dual purpose of a data gatherer and a beneficiary device. For example, the user equipment may be installed in the vehicle and is configured to detect lane markings on links and/or road segments by using image based sensors installed in the vehicle. The user equipment then sends this detection data to the system 102, which uses optimization techniques to complete any missing parts in the lane markings, improve accuracy of detected lane marking based on real road geometry and generate updated lane marking.

Returning to FIG. 1, the system 102 may be the server 104*b* of the mapping platform 104 and therefore may be co-located with or within the mapping platform 104. For example, the system 102 may be embodied as a cloud based service, a cloud based application, a cloud based platform, a remote server based service, a remote server based application, a remote server based platform, or a virtual computing system. In some other embodiments, the system 102 may be an OEM (Original Equipment Manufacturer) cloud. The OEM cloud may be configured to anonymize any data received from the system 102, such as the vehicle, before using the data for further processing, such as before sending the data to the mapping platform 104. In some embodiments, anonymization of data may be done by the mapping platform 104.

In some embodiments, the communication network 112 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof.

In some embodiments, the map data may be collected by end-user vehicles, such as vehicle 106 which use vehicles' on-board sensors to detect data about various entities such as road objects, lane markings, links, and the like. These vehicles 106 are also referred to as probe vehicles and form an alternate form of data source for map data collection, along with ground truth data. Additionally, data collection mechanisms like remote sensing, such as aerial or satellite photography may be used to collect the data for the map database 104*a*.

Returning to FIG. 2, the processor 302 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 302 may include one or more processing cores configured to perform independently. A multi-core processor may enable multiprocessing within a single physical package. Additionally or alternatively, the processor 302 may include one or more processors configured in tandem via the bus to enable independent execution of instructions, pipelining and/or multithreading. Additionally or alternatively, the processor 302 may include one or more processors capable of processing large volumes of workloads and operations to provide support for big data analysis. In an example embodiment, the processor 302 may be in communication with the memory 304 via a bus for passing information among components of the system 102.

In an example, when the processor 302 is embodied as an executor of software instructions, the instructions may specifically configure the processor 302 to perform the algorithms and/or operations described herein when the instructions are executed. However, in some cases, the processor 302 may be a processor specific device (for example, a mobile terminal or a fixed computing device) configured to employ an embodiment of the present disclosure by further configuration of the processor 302 by instructions for performing the algorithms and/or operations described herein. The processor 302 may include, among other things, a clock, an arithmetic logic unit (ALU) and logic gates configured to support operation of the processor 302. The network environment, such as, 100 may be accessed using the communication interface 306 of the system 102. The communication interface 306 may provide an interface for accessing various features and data stored in the system 102.

For example, the memory 304 may be an electronic storage device (for example, a computer readable storage medium) comprising gates configured to store data (for example, bits) that may be retrievable by a machine (for example, a computing device like the processor 302). The memory 304 may be configured to store information, data, content, applications, instructions, or the like, for enabling the system 102 to carry out various functions in accordance with an example embodiment of the present disclosure. For example, the memory 304 may be configured to buffer input data for processing by the processor 302. The memory 304 may be configured to store instructions for execution by the processor 302.

The memory 304 of the system 102 may be configured to store a dataset (such as, but not limited to, feature data, map data, probe data, sensor data, link data records, lane data records, and navigation or routing instructions) associated with the lane and/or the lane markings. In accordance with an embodiment, the memory 304 may include processing instructions for processing the feature data. The dataset may include real-time data and historical data, from service providers.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

I claim:

1. A system comprising:

a memory configured to store computer executable instructions; and one or more processors configured to execute the instructions to:

obtain first feature data for a first feature line;

obtain second feature data for a second feature line, the second feature line being within a first predefined threshold from the first feature line, wherein the first feature data and the second feature data are sensor based data and wherein the first feature data and the second feature data are inaccurate;

identify an intersection area based on the first feature data and the second feature data, wherein the intersection area comprises a candidate intersection point;

estimate an offset value for the first feature line and the second feature line within the intersection area;

estimate heading information for the candidate intersection point based on the first feature data, the second feature data and the intersection area;

identify an accurate intersection connection point for the first feature line and the second feature line based on the candidate intersection point, the offset value and the heading information;

update map database based on the accurate intersection connection point; and provide navigation instructions to vehicles based on the updated map database.

2. The system of claim 1, wherein the one or more processors are further configured to:

determine a median offset value for a first area based on the first feature data and the second feature data, wherein the first area is within a second predefined threshold from the intersection area; and estimate the intersection connection point based on the median offset value for the first area.

3. The system of claim 2, wherein the one or more processors are further configured to:

estimate the intersection connection point based on an optimization function, wherein the optimization function is associated with the offset value, the heading information, and the median offset value.

4. The system of claim 1, wherein the one or more processors are further configured to:

estimate a median line segment within the intersection area, such that the median line segment is equally distanced from the first feature line and the second feature line, and the candidate intersection point lies on the median line segment.

5. The system of claim 1, wherein the one or more processors are further configured to:

estimate a heading line for the first feature line and the second feature line, the heading line extending from the candidate intersection point to a first end location point of one of the first feature line or the second feature line; and estimate the heading information for the candidate intersection point based on the heading line.

6. The system of claim 1, wherein the first feature line and the second feature line comprises an intersection location therebetween, and wherein the intersection connection point corresponds to the intersection location.

7. The system of claim 1, wherein the one or more processors are further configured to:

obtain first detection data of a first detection line associated with the first feature line, the first detection data comprising a first number of detection points;

obtain second detection data of a second detection line associated with the first feature line, the second detection data comprising a second number of detection points, wherein the first number of detection points is greater than the second number of detection points; and generate third detection data for the second detection line based on the first number of detection points and the second detection data, the third detection data comprising a third number of detection points corresponding to the first number of detection points.

8. The system of claim 7, wherein the one or more processors are further configured to:

identify an overlapping area for the first detection line and the third detection line, the overlapping area comprising a first set of detection points from the first detection data and a second set of detection points from the third detection data;

generate matched location data for the overlapping area, the matched location data being generated by dropping a perpendicular from each of the second set of detection points to a corresponding matched location point on the first detection line; and generate merging data for the overlapping area based on the matched location data, the merging data comprising a median location point for each of the perpendicular.

9. The system of claim 8, wherein the one or more processors are further configured to:

identify a non-overlapping area for the first detection line and the third detection line, the non-overlapping area comprising one or more disconnected points relating to one of: the first detection data, or the third detection data;

generate a merging line segment based on the merging data; and generate one or more connection points for the non-overlapping area, the one or more connection points being within a distance threshold from the one or more disconnected points, wherein the one or more connection points has a gradual offset from the merging line segment towards an end point from the one or more disconnected points.

10. The system of claim 9, wherein the one or more processors are further configured to:

generate the first feature data for the first feature line based on at least one of: the merging data, or the one or more connection points.

11. A method comprising:

obtaining first feature data for a first feature line;

obtaining second feature data for a second feature line, the second feature line being within a first predefined threshold from the first feature line, wherein the first feature data and the second feature data are sensor based data and wherein the first feature data and the second feature data are inaccurate;

identifying an intersection area based on the first feature data and the second feature data, wherein the intersection area comprises a candidate intersection point;

estimating an offset value for the first feature line and the second feature line within the intersection area;

estimating heading information for the candidate intersection point based on the first feature data, the second feature data and the intersection area;

identifying an accurate intersection connection point for the first feature line and the second feature line based on the candidate intersection point, the offset value and the heading information;

updating map database based on the accurate intersection connection point; and providing navigation instructions to vehicles based on the updated map database.

12. The method of claim 11, the method further comprising:

determining a median offset value for a first area based on the first feature data and the second feature data, wherein the first area is within a second predefined threshold from the intersection area; and estimating the intersection connection point based on the median offset value for the first area.

13. The method of claim 12, the method further comprising:

estimating the intersection connection point based on an optimization function, wherein the optimization function is associated with the offset value, the heading information, and the median offset value.

14. The method of claim 11, the method further comprising:

estimating a median line segment within the intersection area, such that the median line segment is equally distanced from the first feature line and the second feature line, and the candidate intersection point lies on the median line segment.

15. The method of claim 11, the method further comprising:

obtaining first detection data of a first detection line associated with the first feature line, the first detection data comprising a first number of detection points;

obtaining second detection data of a second detection line associated with the first feature line, the second detection data comprising a second number of detection points, wherein the first number of detection points is greater than the second number of detection points; and generating third detection data for the second detection line based on the first number of detection points and the second detection data, the third detection data comprising a third number of detection points corresponding to the first number of detection points.

16. The method of claim 15, the method further comprising:

identifying an overlapping area for the first detection line and the third detection line, the overlapping area comprising a first set of detection points from the first detection data and a second set of detection points from the third detection data;

generating matched location data for the overlapping area, the matched location data being generated by dropping a perpendicular from each of the second set of detection points to a corresponding matched location point on the first detection line; and generating merging data for the overlapping area based on the matched location data, the merging data comprising a median location point for each of the perpendicular.

17. The method of claim 16, the method further comprising:

identifying a non-overlapping area for the first detection line and the third detection line, the non-overlapping area comprising one or more disconnected points relating to one of: the first detection data, or the third detection data;

generating a merging line segment based on the merging data; and generating one or more connection points for the non-overlapping area, the one or more connection points being within a distance threshold from the one or more disconnected points, wherein the one or more connection points has a gradual offset from the merging line segment towards an end point from the one or more disconnected points; and generating the first feature data for the first feature line based on at least one of: the merging data, or the one or more connection points.

18. A computer programmable product comprising a non-transitory computer readable medium having stored thereon computer executable instructions, which when executed by one or more processors, cause the one or more processors to carry out operations comprising:

obtaining first feature data for a first feature line;

obtaining second feature data for a second feature line, the second feature line being within a first predefined threshold from the first feature line, wherein the first feature data and the second feature data are sensor based data and wherein the first feature data and the second feature data are inaccurate;

identifying an intersection area based on the first feature data and the second feature data, wherein the intersection area comprises a candidate intersection point;

estimating an offset value for the first feature line and the second feature line within the intersection area;

estimating heading information for the candidate intersection point based on the first feature data, the second feature data and the intersection area;

identifying an accurate intersection connection point for the first feature line and the second feature line based on the candidate intersection point, the offset value and the heading information;

updating map database based on the estimated intersection connection point; and providing navigation instructions to vehicles based on the updated map database.

19. The computer programmable product of claim 18, the operations further comprising:

determining a median offset value for a first area based on the first feature data and the second feature data, wherein the first area is within a second predefined threshold from the intersection area; and estimating the intersection connection point based on the median offset value for the first area.

20. The computer programmable product of claim 18, the operations further comprising:

obtaining first detection data of a first detection line associated with the first feature line;

obtaining second detection data of a second detection line associated with the first feature line;

identifying an overlapping area and a non-overlapping area for the first detection line and the second detection line, the overlapping area comprising a first set of detection points from the first detection data and a second set of detection points from the second detection data, and the non-overlapping area comprising one or more disconnected points relating to one of: the first detection data, or the third detection data;

generating merging data for the overlapping area, the merging data comprising a median location point for each of the perpendicular;

generating one or more connection points for the non-overlapping area, the one or more connection points being within a distance threshold from the one or more disconnected points, wherein the one or more connection points has a gradual offset from the merging line segment towards an end point from the one or more disconnected points; and generating the first feature data for the first feature line based on at least one of: the merging data, or the one or more connection points.

* * * * *